(12) United States Patent
Asayama et al.

(10) Patent No.: US 10,971,886 B2
(45) Date of Patent: Apr. 6, 2021

(54) LASER APPARATUS

(71) Applicant: Gigaphoton Inc., Tochigi (JP)

(72) Inventors: Takeshi Asayama, Oyama (JP); Hiroyuki Masuda, Oyama (JP)

(73) Assignee: Gigaphoton Inc., Tochigi (JP)

( * ) Notice: Subject to any disclaimer, the term of this patent is extended or adjusted under 35 U.S.C. 154(b) by 13 days.

(21) Appl. No.: 16/266,189

(22) Filed: Feb. 4, 2019

(65) Prior Publication Data
US 2019/0173259 A1 Jun. 6, 2019

Related U.S. Application Data

(63) Continuation of application No. PCT/JP2016/076521, filed on Sep. 8, 2016.

(51) Int. Cl.
*H01S 3/097* (2006.01)
*H01S 3/036* (2006.01)
(Continued)

(52) U.S. Cl.
CPC .......... *H01S 3/09702* (2013.01); *H01S 3/036* (2013.01); *H01S 3/038* (2013.01);
(Continued)

(58) Field of Classification Search
CPC ........ H01S 3/0071; H01S 3/036; H01S 3/038; H01S 3/08004; H01S 3/08009;
(Continued)

(56) References Cited

U.S. PATENT DOCUMENTS 6,130,904 A * 10/2000 Ishihara ................. H01S 3/036
372/59
2002/0021731 A1 2/2002 Bragin et al.
(Continued)

FOREIGN PATENT DOCUMENTS

CN 101013790 A 8/2007
CN 105846291 A 8/2016
(Continued)

OTHER PUBLICATIONS

An Office Action mailed by the China National Intellectual Property Administration dated May 26, 2020, which corresponds to Chinese Patent Application No. 201680088582.0 and is related to U.S. Appl. No. 16/266,189 with English language translation.
(Continued)

*Primary Examiner* — Yuanda Zhang
(74) *Attorney, Agent, or Firm* — Studebaker & Brackett PC

(57) ABSTRACT

A laser apparatus includes a chamber accommodating a pair of discharge electrodes, a gas supply and exhaust device configured to supply laser gas to an interior of the chamber and exhaust laser gas from the interior of the chamber, and a controller. The controller performs first control to control the gas supply and exhaust device so as to suspend laser oscillation and replace laser gas in the chamber at every first number of pulses or first elapsed time, and second control to control the gas supply and exhaust device so as to suspend laser oscillation and replace laser gas in the chamber before the first control at every second number of pulses less than the first number of pulses or second elapsed time less than the first elapsed time.

11 Claims, 16 Drawing Sheets

(51) Int. Cl.
*H01S 3/134* (2006.01)
*H01S 3/225* (2006.01)
*H01S 3/104* (2006.01)
*H01S 3/038* (2006.01)
*H01S 3/0971* (2006.01)
*H01S 3/10* (2006.01)
*H01S 3/08* (2006.01)
*H01S 3/23* (2006.01)
*H01S 3/00* (2006.01)

(52) U.S. Cl.
CPC .............. *H01S 3/104* (2013.01); *H01S 3/134* (2013.01); *H01S 3/2251* (2013.01); *H01S 3/0071* (2013.01); *H01S 3/08004* (2013.01); *H01S 3/08009* (2013.01); *H01S 3/0971* (2013.01); *H01S 3/10038* (2013.01); *H01S 3/10069* (2013.01); *H01S 3/2308* (2013.01)

(58) Field of Classification Search
CPC .............. H01S 3/09702; H01S 3/0971; H01S 3/10038; H01S 3/10069; H01S 3/104; H01S 3/134; H01S 3/2251; H01S 3/2308
See application file for complete search history.

(56) References Cited

U.S. PATENT DOCUMENTS

| | | | |
|---|---|---|---|
| 2004/0022293 A1* | 2/2004 | Rule | G03F 7/70025 372/58 |
| 2005/0185690 A1 | 8/2005 | Rule et al. | |
| 2006/0239322 A1 | 10/2006 | Matsunaga et al. | |
| 2007/0177649 A1 | 8/2007 | Kubo et al. | |
| 2008/0115342 A1 | 5/2008 | Fujimoto et al. | |
| 2013/0100980 A1* | 4/2013 | Abe | H01S 3/225 372/57 |
| 2015/0188274 A1* | 7/2015 | Wakabayashi | H01S 3/134 372/25 |
| 2016/0226213 A1 | 8/2016 | Yuda et al. | |
| 2016/0248215 A1 | 8/2016 | Suzuki et al. | |

FOREIGN PATENT DOCUMENTS

| | | |
|---|---|---|
| JP | H7-321389 A | 12/1995 |
| JP | H11-284251 A | 10/1999 |
| JP | 2002-118309 A | 4/2002 |
| JP | 2002-208746 A | 7/2002 |
| JP | 2005-524996 A | 8/2005 |
| JP | 2012-018979 A | 1/2012 |
| WO | 2006/076261 A2 | 7/2006 |
| WO | 2015/076415 A1 | 5/2015 |

OTHER PUBLICATIONS

International Search Report issued in corresponding International Application No. PCT/JP2016/076521; dated Nov. 29, 2016.
International Preliminary Report on Patentability (Chapter I) and Written Opinion of the International Searching Authority; PCT/JP2016/076521; dated Mar. 12, 2019.
An Office Action; "Notice of Reasons for Refusal," mailed by the Japanese Patent Office dated Aug. 18, 2020, which rresponds to Japanese Patent Application No. 2018-537937 and is related to U.S. Appl. No. 16/266,189 ; with English language translation.

* cited by examiner

US 10,971,886 B2

LASER APPARATUS

CROSS-REFERENCE TO RELATED APPLICATIONS

The present application is a continuation application of International Application No. PCT/JP2016/076521 filed on Sep. 8, 2016. The content of the application is incorporated herein by reference in its entirety.

TECHNICAL FIELD

The present disclosure relates to a laser apparatus.

BACKGROUND ART

The recent miniaturization and increased levels of integration of semiconductor integrated circuits have led to a demand for increases in resolutions of semiconductor exposure apparatuses. A semiconductor exposure apparatus is hereinafter referred to simply as "exposure apparatus". Accordingly, exposure light sources to output light at shorter wavelengths have been under development. As the exposure light sources, gas laser apparatuses instead of conventional mercury lamps are typically used. The gas laser apparatuses for exposure include a KrF excimer laser apparatus that outputs an ultraviolet laser beam at a wavelength of 248 nm and an ArF excimer laser apparatus that outputs an ultraviolet laser beam at a wavelength of 193 nm.

As a current exposure technology, immersion exposure has been put to practical use. In the immersion exposure, a gap between a projection lens and a wafer in an exposure apparatus is filled with a fluid such as water to change refractive index in the gap such that an apparent wavelength of the light from the exposure light source is shortened. In a case where immersion exposure is performed using an ArF excimer laser apparatus as an exposure light source, a wafer is irradiated with ultraviolet light whose wavelength in water is equivalent to 134 nm. This technology is referred to as "ArF immersion exposure". The ArF immersion exposure is also referred to as "ArF immersion lithography".

Spectrum line widths of KrF and ArF excimer laser apparatuses in natural oscillation are as wide as approximately 350 pm to 400 pm. This causes a chromatic aberration of an ultraviolet laser beam that is subjected to reduced projection onto a wafer by a projection lens in an exposure apparatus. The chromatic aberration thus causes a reduction in resolving power. Accordingly, spectrum line width of a laser beam that is outputted from a gas laser apparatus needs to be narrowed to such an extent that the chromatic aberration can be ignored. The spectrum line width is also referred to as "spectrum width". To narrow the spectrum width, a laser resonator of a gas laser apparatus is equipped with a line narrow module having a line narrow element. The line narrow element may be an etalon, a grating, or the like. A laser apparatus whose spectrum width is narrowed in this way is referred to as "line narrowed laser apparatus".

Patent Document 1: US Patent Application Publication No. 2006/0239322 A

Patent Document 2: Japanese Patent Application Publication No. 2002-208746 A

Patent Document 3: US Patent Application Publication No. 2008/0115342 A

SUMMARY

An aspect of the present disclosure relates to a laser apparatus including a chamber accommodating a pair of discharge electrodes, a gas supply and exhaust device configured to supply laser gas to an interior of the chamber and exhaust laser gas from the interior of the chamber, and a controller. The controller performs first control to control the gas supply and exhaust device so as to suspend laser oscillation and replace laser gas in the chamber at every first number of pulses or first elapsed time, and second control to control the gas supply and exhaust device so as to suspend laser oscillation and replace laser gas in the chamber before the first control at every second number of pulses less than the first number of pulses or second elapsed time less than the first elapsed time.

Another aspect of the present disclosure relates to a laser apparatus including a chamber accommodating a pair of discharge electrodes, a gas supply and exhaust device configured to supply laser gas to an interior of the chamber and exhaust laser gas from the interior of the chamber, a pressure sensor configured to measure a gas pressure in the chamber, and a controller. The controller performs first control to control the gas supply and exhaust device so as to suspend laser oscillation and replace laser gas in the chamber at every first number of pulses or first elapsed time, and second control to control the gas supply and exhaust device so as to suspend laser oscillation and replace laser gas in the chamber when the gas pressure in the chamber reaches a first predetermined gas pressure before the first control.

Another aspect of the present disclosure relates to a laser apparatus including a chamber accommodating a pair of discharge electrodes, a gas supply and exhaust device configured to supply laser gas to an interior of the chamber and exhaust laser gas from the interior of the chamber, and a controller. The controller performs first control to control the gas supply and exhaust device so as to supply a first amount of laser gas to the interior of the chamber or exhaust the first amount of laser gas from the interior of the chamber while performing laser oscillation, and second control to control the gas supply and exhaust device so as to supply a second amount of laser gas larger than the first amount to the interior of the chamber or exhaust the second amount of laser gas from the interior of the chamber while performing laser oscillation before the first control.

BRIEF DESCRIPTION OF DRAWINGS

Exemplary embodiments of the present disclosure will be described below as mere examples with reference to the appended drawings.

DESCRIPTION OF EMBODIMENTS

Figure 1:
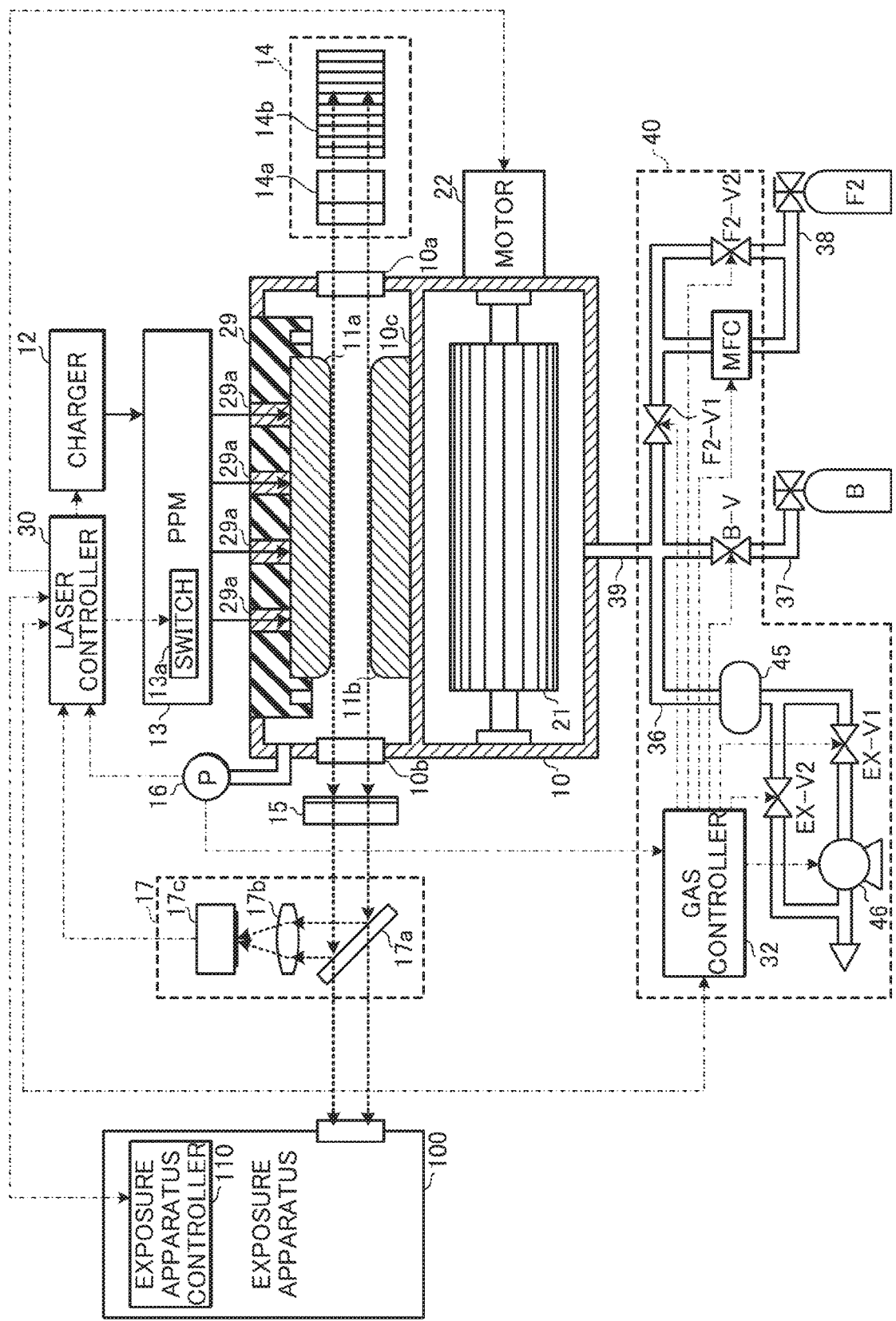
FIG. 1 schematically shows a configuration of a laser apparatus according to a comparative example.

<Contents>
1. Summary
2. Description of Terms
3. Laser Apparatus According to Comparative Example
  3.1 Configuration
    3.1.1 Laser Oscillation System
    3.1.2 Gas Supply and Exhaust Device
  3.2 Operation
    3.2.1 Operation of Laser Oscillation System
    3.2.2 Energy Control
    3.2.3 Laser Gas Control
      3.2.3.1 Total Gas Replacement
      3.2.3.2 Gas Pressure Control Including Gas Supply or Gas Exhaust
      3.2.3.3 Halogen Gas Injection Control
      3.2.3.4 Partial Gas Replacement Control
      3.2.3.5 Determination Whether or Not Total Gas Replacement Is to Be Performed
  3.3 Problem
4. Laser Apparatus in Which Frequency of Total Gas Replacement Is High Immediately After Replacement of Chamber
5. Laser Apparatus in Which Total Gas Replacement Is Performed When Gas Pressure Reaches Predetermined Gas Pressure Immediately After Replacement of Chamber
6. Laser Apparatus in Which Injection and Exhaust Amount in Partial Gas Replacement or Halogen Gas Injection Is Large Immediately After Replacement of Chamber
7. MOPO System
8. Configuration of Controller Embodiments of the present disclosure will be described in detail below with reference to the drawings. The embodiments described below indicate several examples of the present disclosure, and may not intend to limit the content of the present disclosure. Not all of the configurations and operations described in the embodiments are indispensable in the present disclosure. Identical reference symbols are assigned to identical constituent elements and redundant descriptions thereof are omitted.

1. Summary

An embodiment of the present disclosure relates to a discharge-excited gas laser apparatus. More specifically, the embodiment of the present disclosure relates to an excimer laser apparatus. In the excimer laser apparatus, a laser gas including a rare gas and a halogen gas is sealed in a chamber. A pulsed high voltage is applied across a pair of discharge electrodes provided in the chamber. An electric discharge is thus occurred between the discharge electrodes to excite the laser gas. The excited laser gas generates light, which reciprocates in an optical resonator and is amplified. A laser beam is thus generated.

Generation of the laser beam with the excimer laser apparatus causes impurities to be generated in the laser gas and accumulated in the chamber. The impurities in the laser gas absorb laser beam or worsen a condition of the electric discharge. To moderate the reduction in the output of the laser beam, the gas pressure in the chamber is increased. To remove impurities in the laser gas, the laser gas is replaced when the number of pulses or the elapsed time reaches a corresponding preset value.

Normally, the number of pulses or the elapsed time reaches the corresponding preset value and thus the laser gas is replaced before the gas pressure in the chamber reaches an upper limit value. However, the surface portions of the components in the chamber may react with halogen gas in the laser gas to generate more impurities in a situation immediately after the replacement of the chamber than in a normal situation. In that case, the gas pressure in the chamber may reach the upper limit value before the number of pulses or the elapsed time reaches the corresponding preset value.

An embodiment of the present disclosure includes a proposal of laser gas control that prevents the gas pressure reaching the upper limit value immediately after the replacement of the chamber. An embodiment of the present disclosure further includes a proposal of a laser apparatus executing such laser gas control.

2. Description of Terms

In this specification, "passivation" is a process of causing surfaces of components in a chamber to react with halogen gas to passivate the surfaces to achieve a state of chemical equilibrium. This process causes coating to be formed on the surfaces and suppresses further generation of impurities.

3. Laser Apparatus According to Comparative Example 3.1 Configuration

FIG. 1 schematically shows a configuration of a laser apparatus according to a comparative example.

The laser apparatus is used with an exposure apparatus 100. The laser beam outputted from the laser apparatus enters to the exposure apparatus 100. The exposure apparatus 100 includes an exposure apparatus controller 110. The exposure apparatus controller 110 is configured to control the exposure apparatus 100. The exposure apparatus controller 110 sends setting data of a target value of pulse energy and an oscillation trigger signal to the laser controller 30 in the laser apparatus.

The laser apparatus shown in FIG. 1 includes a laser oscillation system, a laser controller 30, and a gas supply and exhaust device 40. The laser oscillation system includes a chamber 10, a charger 12, a pulse power module 13, a line narrow module 14, an output coupling mirror 15, a pressure sensor 16, an energy monitor 17, a cross-flow fan 21, and a motor 22.

The laser controller 30 integrally controls the entire laser apparatus. The laser controller 30 receives measured data from the energy monitor 17.

2.1.1 Laser Oscillation System

The chamber 10 of the laser oscillation system is provided in an optical path of a laser resonator configured by the line narrow module 14 and the output coupling mirror 15. The chamber 10 is accompanied by two windows 10a and 10b. The chamber 10 accommodates a pair of discharge electrodes 11a and 11b. The chamber 10 also accommodates laser gas.

The chamber 10 has an opening. The opening is covered with an insulating member 29. The discharge electrode 11a is supported by the insulating member 29. The discharge electrode 11b is supported by a partitioning plate 10c of the chamber 10. Conductive members 29a are molded in the insulating member 29. A pulsed high voltage supplied from the pulse power module 13 is applied via the conductive members 29a to the discharge electrode 11a.

The partitioning plate 10c does not completely separate the interior of the chamber 10. The partitioning plate 10c leaves unillustrated gaps through which the laser gas passes in front and back of the paper surface of FIG. 1.

The cross-flow fan 21 is provided in the chamber 10. The rotating shaft of the cross-flow fan 21 is connected to the motor 22 provided outside of the chamber 10. The motor 22 rotates the cross-flow fan 21 according to a control signal from the laser controller 30. The cross-flow fan 21 rotated by the motor 22 causes the laser gas to be circulated in the chamber 10.

The charger 12 holds the electric energy to be supplied to the pulse power module 13. The pulse power module 13 includes a switch 13a. The pulse power module 13 is configured to apply the pulsed voltage across the discharge electrodes 11a and 11b.

The line narrow module 14 includes a wavelength-selecting element such as a prism 14a or a grating 14b. The line narrow module 14 may be substituted by a high-reflective mirror.

The output coupling mirror 15 is configured by a partially reflective mirror.

The pressure sensor 16 is configured to measure the pressure of the laser gas in the chamber 10. The pressure sensor 16 sends the measured data on the pressure to a gas controller 32 in the gas supply and exhaust device 40.

The energy monitor 17 includes a beam splitter 17a, a focusing lens 17b, and an optical sensor 17c. The beam splitter 17a is provided in an optical path of the laser beam outputted through the output coupling mirror 15. The beam splitter 17a is configured to transmit a part of the laser beam outputted through the output coupling mirror 15 to the exposure apparatus 100 at a high transmittance and reflect another part. The focusing lens 17b and the optical sensor 17c are provided in an optical path of the laser beam reflected by the beam splitter 17a. The focusing lens 17b is configured to cause the laser beam reflected by the beam splitter 17a to be concentrated on the optical sensor 17c. The optical sensor 17c generates an electric signal according to the pulse energy of the laser beam concentrated by the focusing lens 17b and sends the electric signal as the measured data to the laser controller 30.

3.1.2 Gas Supply and Exhaust Device

The gas supply and exhaust device 40 in the laser apparatus includes the gas controller 32. The gas controller 32 is configured to send and receive signals to and from the laser controller 30. The gas controller 32 receives the measured data outputted from the pressure sensor 16.

The gas supply and exhaust device 40 includes pipes 37 and 38, valves B-V, F2-V1, and F2-V2, and a mass-flow controller MFC.

The pipe 38 is connected to a halogen-containing gas supply source F2. The pipe 38 is connected to a pipe 39, which is connected to the chamber 10. The halogen-containing gas supply source F2 is thus capable of supplying halogen-containing gas to the chamber 10. The halogen-containing gas supply source F2 is a gas cylinder that stores laser gas containing fluorine gas. The halogen-containing gas is a laser gas in which fluorine gas, krypton gas, and neon gas are mixed. Another example of the halogen-containing gas may include a gas in which fluorine or chlorine gas, argon or xenon gas, and neon or helium gas are mixed.

The valve F2-V1 is provided in the pipe 38. A part of the pipe 38 is divided into two branches. The valve F2-V2 is provided in one of the branches and the mass-flow controller MFC is provided in the other one. Supply of the halogen-containing gas from the halogen-containing gas supply source F2 via the pipe 39 to the chamber 10 is controlled by a combination of the valves F2-V1 and F2-V2 or a combination of the valve F2-V1 and the mass-flow controller MFC. The valves F2-V1 and F2-V2 and the mass-flow controller MFC are controlled by the gas controller 32.

The pipe 37 is connected between a buffer gas supply source B and the pipe 39. The pipe 37 is connected to the pipe 39. The buffer gas supply source B is thus capable of supplying the buffer gas to the chamber 10. The buffer gas is a laser gas containing krypton gas and neon gas. The buffer gas hardly contains halogen gas. Alternatively, the buffer gas may contain halogen gas at a concentration lower than the halogen-containing gas supplied from the halogen-containing gas supply source F2. Another example of the buffer gas may include a laser gas containing argon or xenon gas and neon or helium gas as a rare gas.

The valve B-V is provided in the pipe 37. Supply of the buffer gas from the buffer gas supply source B via the pipe 39 to the chamber 10 is controlled by opening and closing of the valve B-V. The opening and closing of the valve B-V are controlled by the gas controller 32.

The gas supply and exhaust device 40 further includes a pipe 36, valves EX-V1 and EX-V2, a halogen gas trap 45, and an exhaust pump 46.

The pipe 36 is connected between the chamber 10 and an unillustrated exhaust gas treating device or the like. The exhaust gas treating device is provided outside of the gas supply and exhaust device 40. The pipe 36 is connected to the pipe 39. The laser gas is thus capable of being exhausted from the chamber 10 to the outside of the gas supply and exhaust device 40.

The halogen gas trap 45 is provided in the pipe 36. The halogen gas trap 45 is configured to catch the halogen gas contained in the laser gas exhausted from the chamber 10. A treating agent to catch the halogen gas is, for example, activated carbon.

A part of the pipe 36 is divided into two branches. The valve EX-V1 and the exhaust pump 46 are provided in one of the branches and the valve EX-V2 is provided in the other one. Exhaust of the gas from the chamber 10 via the halogen gas trap 45 is controlled by the valve EX-V2 or a combination of the valve EX-V1 and the exhaust pump 46.

The valve EX-V1 and the exhaust pump 46 are controlled by the gas controller 32. The exhaust pump 46 is, with the valve EX-V1 being open, capable of forcibly exhausting the laser gas in the chamber 10 until the pressure reaches a pressure lower than or equal to the atmospheric pressure.

The valve EX-V2 is controlled by the gas controller 32. Opening the valve EX-V2 causes a part of the laser gas in the chamber 10 to be exhausted due to the difference between the pressure in the chamber 10 and the atmospheric pressure.

3.2 Operation 3.2.1 Operation of Laser Oscillation System

The laser controller 30 receives, from the exposure apparatus controller 110, the setting data of the target value of pulse energy and the oscillation trigger signal. The laser controller 30 sends setting data of the charging voltage to the charger 12 based on the setting data of the target value of pulse energy received from the exposure apparatus controller 110. The laser controller 30 further sends a trigger signal to the switch 13a included in the pulse power module (PPM) 13 based on the oscillation trigger signal received from the exposure apparatus controller 110.

The switch 13a in the pulse power module 13 is turned on upon receiving the trigger signal from the laser controller 30. When the switch 13a is turned on, the pulse power module 13 generates the pulsed high voltage from the electric energy charged in the charger 12. The high voltage is applied across the discharge electrodes 11a and 11b.

The pulsed high voltage applied across the discharge electrodes 11a and 11b causes electric discharge between the discharge electrodes 11a and 11b. The laser gas in the chamber 10 is excited by the energy of the electric discharge and shifts to a high energy level. The excited laser gas then shifts back to a low energy level to emit light having a wavelength according to the difference in the energy levels.

The light generated in the chamber 10 is emitted from the chamber 10 via the windows 10a and 10b. The light emitted via the window 10a of the chamber 10 is expanded in its beam width by the prism 14a and incident on the grating 14b. The light incident on the grating 14b from the prism 14a is reflected by the grooves of the grating 14b and diffracted to directions according to the wavelengths of the light. The grating 14b is in a Littrow arrangement such that the angle of incidence of the light incident on the grating 14b from the prism 14a coincides with the angle of diffraction of the diffracted light having the desired wavelength. The light around the desired wavelength is thus returned via the prism 14a to the chamber 10.

The output coupling mirror 15 transmits and outputs a part of the light emitted from the chamber 10 via the window 10b and reflects and returns another part to the chamber 10.

The light emitted from the chamber 10 thus reciprocates between the line narrow module 14 and the output coupling mirror 15. The light is amplified every time it passes through an electric discharge space between the discharge electrodes 11a and 11b. Further, the light is narrow-banded every time it is returned by the line narrow module 14. A laser beam thus being generated by the laser oscillation and narrow-banded is outputted through the output coupling mirror 15.

The energy monitor 17 detects the pulse energy of the laser beam outputted through the output coupling mirror 15. The energy monitor 17 sends the data of the detected pulse energy to the laser controller 30.

Based on the measured data of the pulse energy received from the energy monitor 17 and the setting data of the target value of pulse energy received from the exposure apparatus controller 110, the laser controller 30 performs feedback control of the charging voltage of the charger 12.

3.2.2 Energy Control

Figure 2:
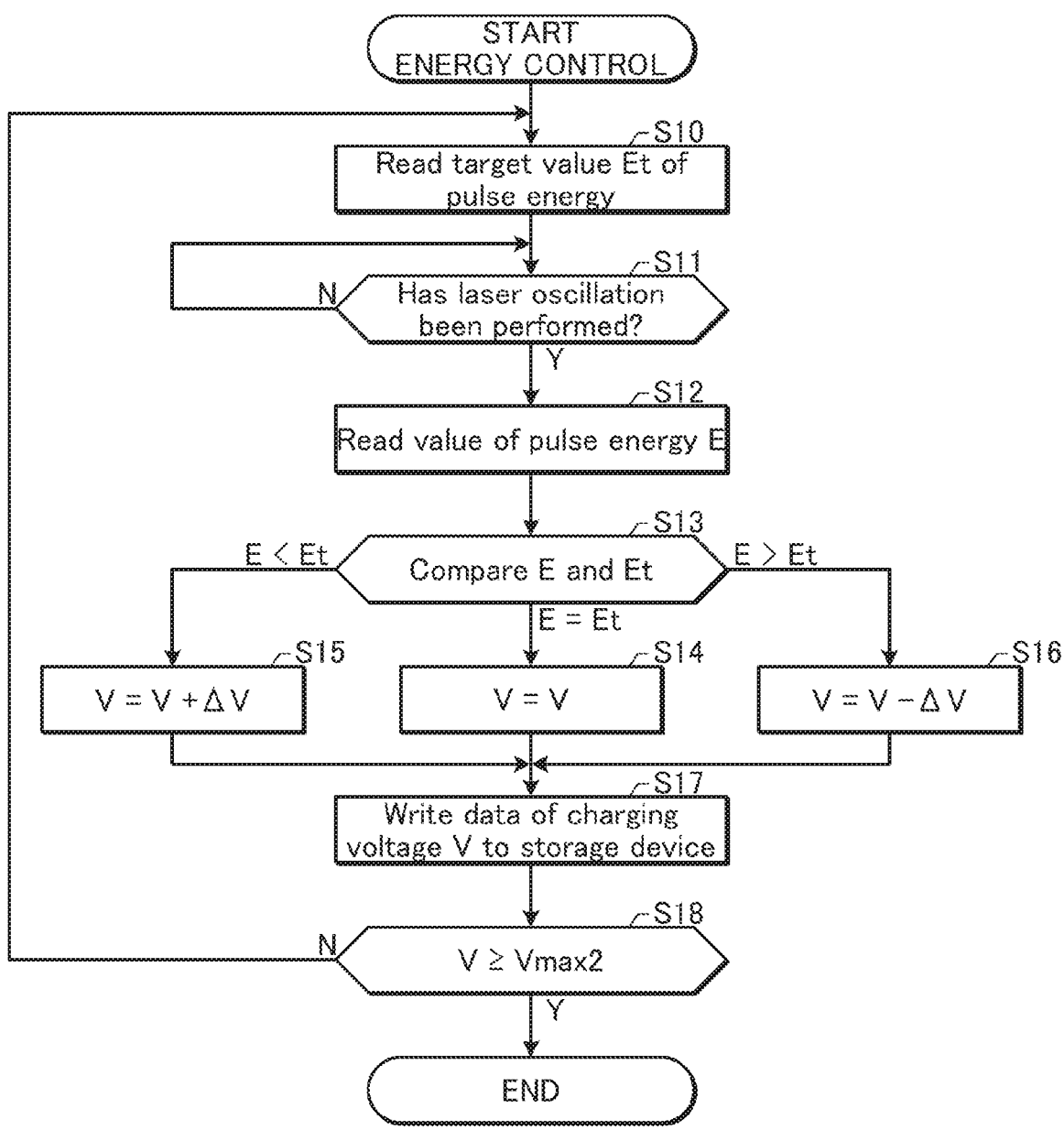
FIG. 2 is a flowchart showing energy control performed by a laser controller 30 of the laser apparatus according to the comparative example.

FIG. 2 is a flowchart showing energy control performed by the laser controller 30 of the laser apparatus according to the comparative example. The laser controller 30 performs the following process to control the charging voltage of the charger 12 such that the pulse energy of the output laser beam approaches the target value of pulse energy.

First, the laser controller 30 reads a target value Et of pulse energy of the laser beam (S10). The target value Et of pulse energy is, for example, a value demanded by the exposure apparatus controller 110.

Next, the laser controller 30 determines whether or not the laser oscillation has been performed (S11). Such determination is made by whether or not the laser controller 30 has sent various signals for laser oscillation to the charger 12 and the pulse power module 13. Alternatively, such determination is made by whether or not the laser controller 30 has received the data of the pulse energy E from the energy monitor 17.

Next, the laser controller 30 reads the value of the pulse energy E of the laser beam (S12). The value of the pulse energy E is received from the energy monitor 17.

Next, the laser controller 30 compares the value of the pulse energy E of the laser beam and the target value Et of pulse energy (S13).

If the value of the pulse energy E is substantially equal to the target value Et of pulse energy (E=Et), the laser controller 30 keeps the present value of the charging voltage V of the charger 12 (S14: V=V).

If the value of the pulse energy E is lower than the target value Et of pulse energy (E<Et), the laser controller 30 increases the charging voltage V of the charger 12 to a value obtained by adding a predetermined amount of change $\Delta V$ to the present value of the charging voltage V (S15: V=V+$\Delta V$). This causes the pulse energy E to be increased and approach the target value Et of pulse energy.

If the value of the pulse energy E is higher than the target value Et of pulse energy (E>Et), the laser controller 30 reduces the charging voltage V of the charger 12 to a value obtained by subtracting the predetermined amount of change $\Delta V$ from the present value of the charging voltage V (S16: V=V−$\Delta V$). This causes the pulse energy E to be reduced and approach the target value Et of pulse energy.

As the laser apparatus repeats the electric discharge and impurities are accumulated in the laser gas, the pulse energy E gets easier to be reduced. Accordingly, in the case where impurities are accumulated in the laser gas, the charging voltage V tends to be increased by the process of S15 unless the gas pressure or another condition changes.

After the control of the charging voltage V in one of S14 to S16, the laser controller 30 writes the data of the charging voltage V to a storage device (S17). The storage device includes, for example, a storage memory 1005 described below. Instead of writing the data, the laser controller 30 may send the data of the charging voltage V to the gas controller 32.

Next, the laser controller 30 determines whether or not the charging voltage V is higher than or equal to a maximum value Vmax2 (S18). If the charging voltage V is higher than or equal to the maximum value Vmax2 (V≥Vmax2), the emission efficiency of the laser beam is low. In that case, it is necessary to suspend the laser oscillation and perform total gas replacement or maintenance of the chamber. Thus, the laser controller 30 ends the process of this flowchart. If the charging voltage V is lower than the maximum value Vmax2 (V<Vmax2), the laser controller 30 returns to S10 and continues the control of the charging voltage V to stabilize the pulse energy E.

3.2.3 Laser Gas Control

Figure 3:
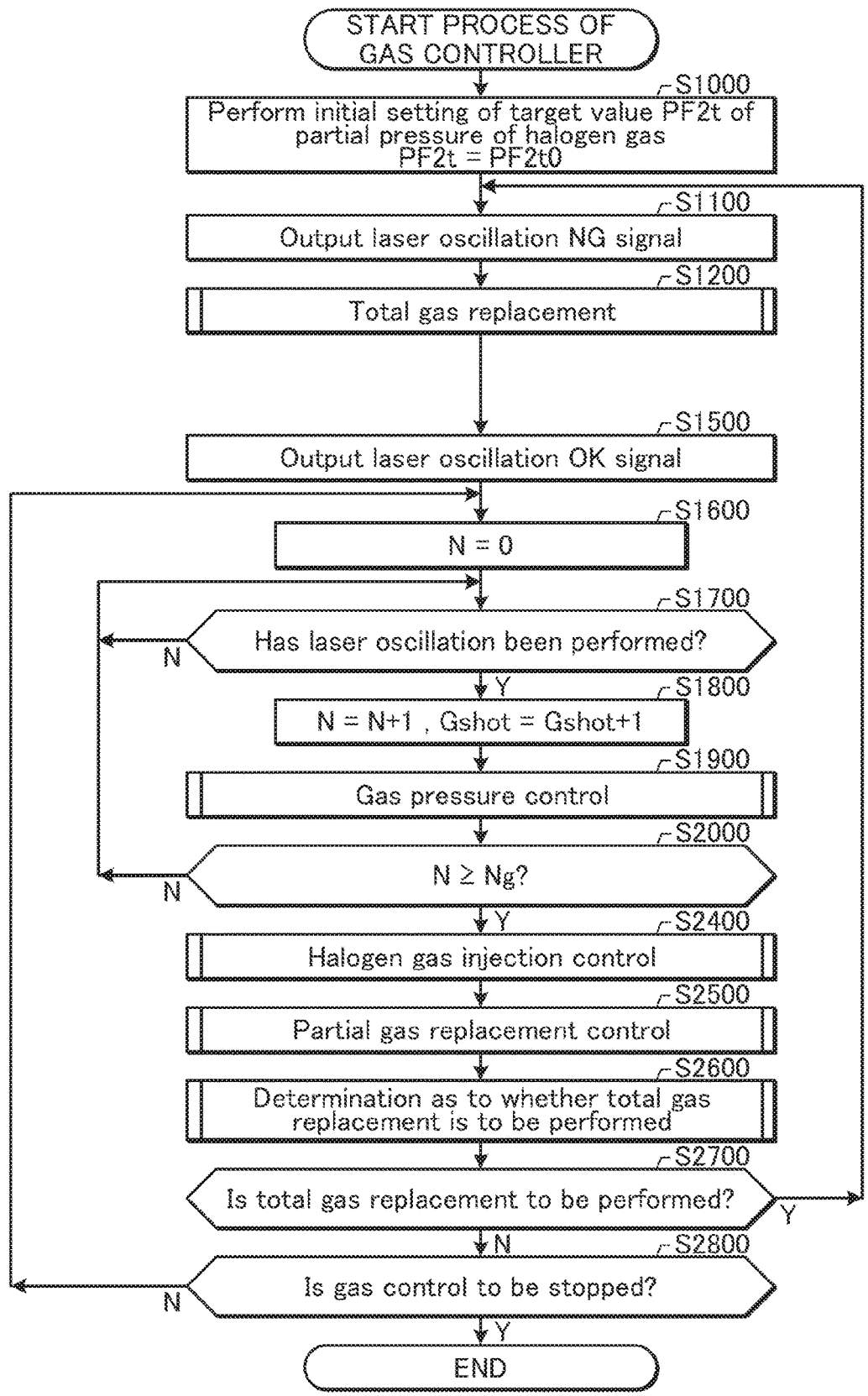
FIG. 3 is a flowchart showing a process of laser gas control performed by a gas controller 32 of the laser apparatus according to the comparative example.

FIG. 3 is a flowchart showing a process of laser gas control performed by the gas controller 32 of the laser apparatus according to the comparative example. The gas controller 32 performs the total gas replacement, gas pressure control, halogen gas injection control, and partial gas replacement control by the following process.

First, at S1000, the gas controller 32 sets the target value PF2t of partial pressure of halogen gas to an initial value PF2t0. The initial value PF2t0 is selected such that the laser gas is excited by an electric discharge between the discharge electrodes 11a and 11b and a pulse laser beam is outputted from the chamber 10. The initial value PF2t0 is, for example, in a range of 0.13 kPa or more and 0.18 kPa or less.

Next, at S1100, the gas controller 32 sends a laser oscillation NG signal to the laser controller 30. The laser oscillation NG signal is a signal to show that the gas condition for laser oscillation is not satisfied.

Next, at S1200, the gas controller 32 controls the gas supply and exhaust device 40 to perform the total gas replacement. The process of the total gas replacement is performed not only when it is determined that the total gas replacement is to be performed as described below (S2600 and S2700) but also immediately after the chamber is installed or replaced. The total gas replacement is performed such that the partial pressure of halogen gas in the chamber 10 is the initial value PF2t0 that has been set. Details of the total gas replacement are described below with reference to FIG. 4.

Next, at S1500, the gas controller 32 outputs a laser oscillation OK signal to the laser controller 30. The laser oscillation OK signal is a signal to show that the gas condition for laser oscillation is satisfied. Based on the laser oscillation OK signal, the laser controller 30 determines that the gas condition in the chamber 10 is satisfied and has the pulse laser beam start being outputted.

Next, at S1600, the gas controller 32 sets the value of a counter N to an initial value 0. The counter N is used for measuring the number of pulses of the pulse laser beam outputted from the laser apparatus.

Next, at S1700, the gas controller 32 determines whether or not the laser oscillation has been performed. Such determination is made, for example, by whether or not the value of the pulse energy E has been received from the energy monitor 17. Alternatively, such determination may be made by whether or not the signals for laser oscillation, which may include the trigger signal, have been outputted from the laser controller 30. If the laser oscillation has not been performed (S1700: NO), the gas controller 32 waits until the laser oscillation is performed. If the laser oscillation has been performed (S1700: YES), the gas controller 32 proceeds to S1800.

At S1800, the gas controller 32 adds 1 to the value of the counter N to update the value of N. The gas controller 32 also adds 1 to the value of the number of pulses Gshot of the pulse laser beam after the total gas replacement to update the value of Gshot. The number of pulses Gshot is described below with reference to FIGS. 4 and 8. Every time the laser apparatus outputs one pulse of the pulse laser beam, the process of S1800 is performed once to update the values of N and Gshot.

Next, at S1900, the gas controller 32 controls the gas supply and exhaust device 40 to perform the gas pressure control. Details of the gas pressure control are described below with reference to FIG. 5.

Next, at S2000, the gas controller 32 determines whether or not the value of the counter N is larger than or equal to a predetermined value Ng. If the value of the counter N is smaller than the predetermined value Ng, the gas controller 32 returns to S1700. If the value of the counter N is larger than or equal to the predetermined value Ng, the gas controller 32 proceeds to S2400.

At S2400, the gas controller 32 controls the gas supply and exhaust device 40 to perform the halogen gas injection control. Details of the halogen gas injection control are described below with reference to FIG. 6.

Next, at S2500, the gas controller 32 controls the gas supply and exhaust device 40 to perform the partial gas replacement control. Details of the partial gas replacement control are described below with reference to FIG. 7.

Here, the process of S2500 is performed next to S2400 each time the number of pulses reaches the predetermined value Ng. However, the present disclosure is not limited to this. Only one of S2400 and S2500 may be selected.

Next, at S2600, the gas controller 32 determines whether or not the total gas replacement is to be performed. Details of the process of the determination are described below with reference to FIG. 8.

Next, at S2700, the gas controller 32 refers to the results of the determination of S2600. If it is determined at S2600 that the total gas replacement is to be performed (S2700: YES), the gas controller 32 returns to S1100. If it is not determined at S2600 that the total gas replacement is to be performed (S2700: NO), the gas controller 32 proceeds to S2800.

Next, at S2800, the gas controller 32 determines whether or not the gas control is to be stopped. If the gas control is to be stopped (S2800: YES), the gas controller 32 ends the process of this flowchart. If the gas control is not to be stopped (S2800: NO), the gas controller 32 returns to S1600.

3.2.3.1 Total Gas Replacement

Figure 4:
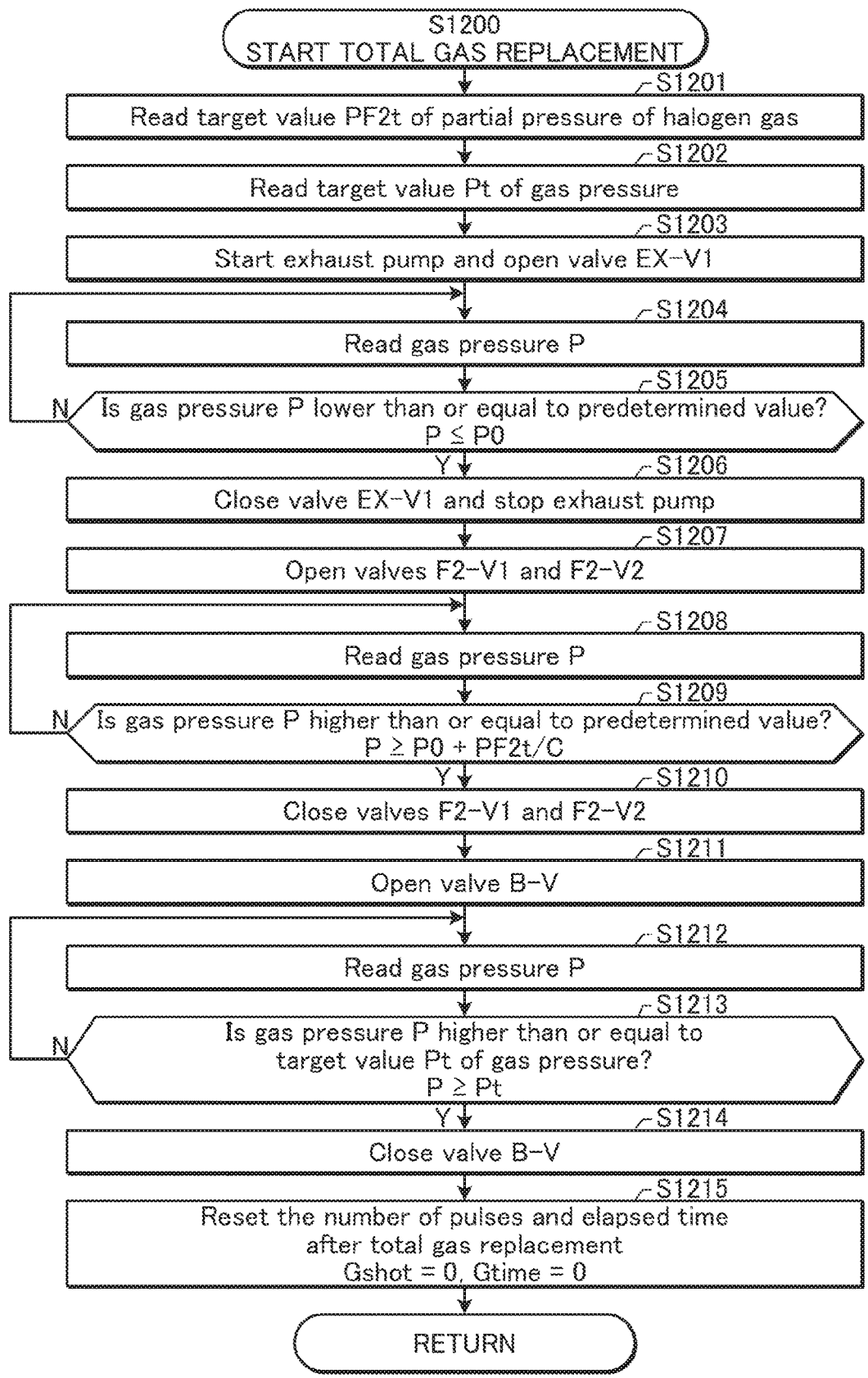
FIG. 4 is a flowchart showing details of a process of total gas replacement shown in FIG. 3.

FIG. 4 is a flowchart showing details of the process of the total gas replacement shown in FIG. 3. The process shown in FIG. 4 is performed as a subroutine of S1200 shown in FIG. 3 by the gas controller 32.

First, at S1201, the gas controller 32 reads the target value PF2t of partial pressure of halogen gas from, for example, the storage memory 1005. The target value PF2t of partial pressure of halogen gas is a value that is set at S1000 of FIG. 3.

Next, at S1202, the gas controller 32 reads the target value Pt of gas pressure from, for example, the storage memory 1005. The target value Pt of gas pressure is set such that the laser gas is excited by an electric discharge between the discharge electrodes 11a and 11b and a pulse laser beam is outputted from the chamber 10.

Next, at S1203, the gas controller 32 starts driving the exhaust pump 46 and opens the valve EX-V1. Exhaust of the laser gas in the chamber 10 thus starts. Here, the valve EX-V2 is kept closed as the exhaust pump 46 forcibly exhausts the gas until the pressure in the chamber 10 reaches a pressure lower than or equal to the atmospheric pressure.

Next, at S1204, the gas controller 32 reads the gas pressure P in the chamber 10 from the pressure sensor 16.

Next, at S1205, the gas controller 32 determines whether or not the gas pressure P is lower than or equal to a predetermined gas pressure P0. The predetermined gas pressure P0 is set in a range of 10 hPa or more and 50 hPa or less.

If the gas pressure P is higher than the predetermined gas pressure P0 (S1205: NO), the gas controller 32 returns to S1204. If the gas pressure P is lower than or equal to the predetermined gas pressure P0 (S1205: YES), the gas controller 32 proceeds to S1206.

At S1206, the gas controller 32 closes the valve EX-V1 and stops driving the exhaust pump 46.

Next, at S1207, the gas controller 32 opens the valves F2-V1 and F2-V2. Injection of the halogen-containing gas into the chamber 10 thus starts. Here, the mass-flow controller MFC is not driven.

Next, at S1208, the gas controller 32 reads the gas pressure P in the chamber 10 from the pressure sensor 16.

Next, at S1209, the gas controller 32 determines whether or not the gas pressure P is higher than or equal to a predetermined gas pressure given by P0+PF2$t$/C. Here, PF2$t$ is the target value of partial pressure of halogen gas. C is a halogen gas concentration in the halogen-containing gas at volume ratio. By injecting the halogen-containing gas into the chamber 10 until the gas pressure P reaches the predetermined gas pressure given by P0+PF2$t$/C, the partial pressure of halogen gas in the chamber 10 approaches the target value of partial pressure of halogen gas.

If the gas pressure P is lower than the predetermined gas pressure given by P0+PF2$t$/C (S1209: NO), the gas controller 32 returns to S1208. If the gas pressure P is higher than or equal to the predetermined gas pressure given by P0+PF2$t$/C (S1209: YES), the gas controller 32 proceeds to S1210.

At S1210, the gas controller 32 closes the valves F2-V1 and F2-V2.

Next, at S1211, the gas controller 32 opens the valve B-V. Injection of the buffer gas into the chamber 10 thus starts.

Next, at S1212, the gas controller 32 reads the gas pressure P in the chamber 10 from the pressure sensor 16.

Next, at S1213, the gas controller 32 determines whether or not the gas pressure P is higher than or equal to the target value Pt of gas pressure. If the gas pressure P is lower than the target value Pt of gas pressure (S1213: NO), the gas controller 32 returns to S1212. If the gas pressure P is higher than or equal to the target value Pt of gas pressure (S1213: YES), the gas controller 32 proceeds to S1214.

At S1214, the gas controller 32 closes the valve B-V.

Figure 8:
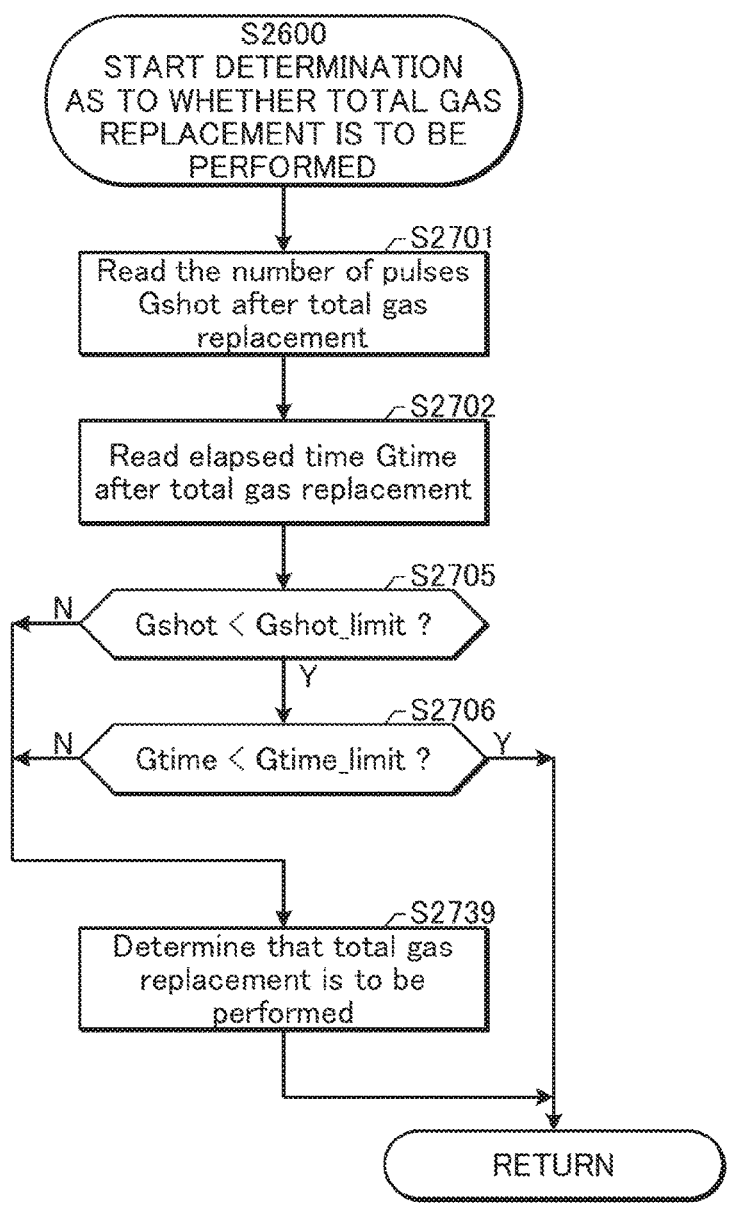
FIG. 8 is a flowchart showing details of a process of determining whether or not the total gas replacement is to be performed shown in FIG. 3.

Next, at S1215, the gas controller 32 resets the number of pulses Gshot of the pulse laser beam after the total gas replacement and an elapsed time Gtime after the total gas replacement. The value of Gshot is updated at every time of performing the laser oscillation. The value of Gtime is updated as time elapses. The values of Gshot and Gtime are used in the determination of whether or not the total gas replacement is to be performed as shown in FIG. 8.

After S1215, the gas controller 32 ends the process of this flowchart and returns to the process shown in FIG. 3.

3.2.3.2 Gas Pressure Control Including Gas Supply or Gas Exhaust

Figure 5:
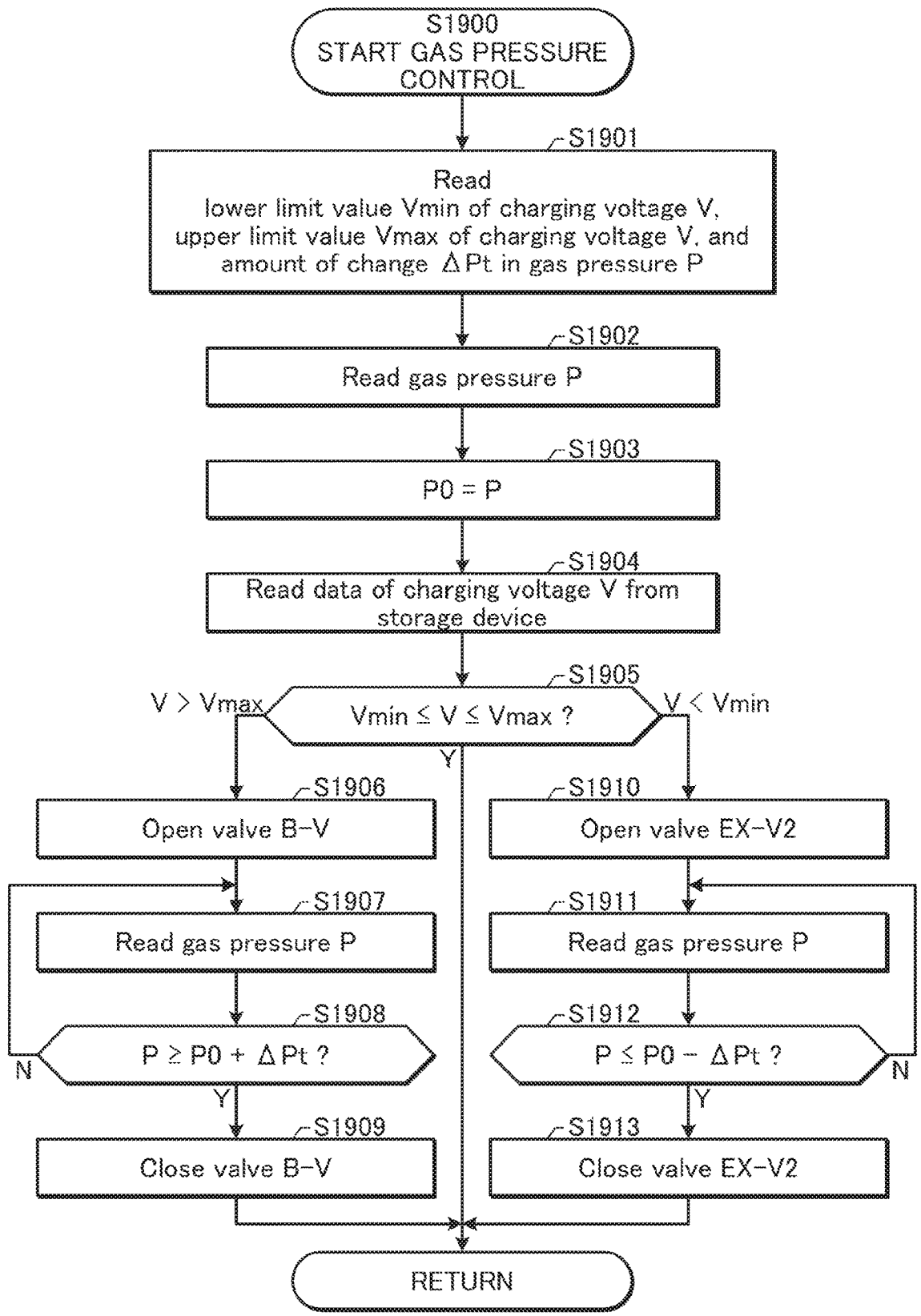
FIG. 5 is a flowchart showing details of a process of gas pressure control shown in FIG. 3.

FIG. 5 is a flowchart showing details of the process of the gas pressure control shown in FIG. 3. The process shown in FIG. 5 is performed as a subroutine of S1900 shown in FIG. 3 by the gas controller 32. The process of the total gas replacement described with reference to FIG. 4 is performed in a period of suspending the laser oscillation. In contrast, the gas pressure control described below is performed in a period of performing the laser oscillation (see S1500 of FIG. 3). The gas controller 32 controls the gas pressure in the chamber 10 based on the charging voltage V, which is set in the energy control shown in FIG. 2.

First, at S1901, the gas controller 32 reads control parameters for controlling the gas pressure from a storage device such as the storage memory 1005. The control parameters for controlling the gas pressure include lower and upper limit values Vmin and Vmax of the charging voltage V. The control parameters also include an amount of change ΔPt in the gas pressure P.

Next, at S1902, the gas controller 32 reads the gas pressure P in the chamber 10 from the pressure sensor 16.

Next, at S1903, the gas controller 32 stores the present gas pressure P as an initial value P0 of the gas pressure in a storage device such as the storage memory 1005.

Next, at S1904, the gas controller 32 reads the value of the charging voltage V from the storage memory 1005 or the like. The value of the charging voltage V is a value that is set in the process described with reference to FIG. 2 such that the pulse energy E approaches the target value Et of pulse energy.

Next, at S1905, the gas controller 32 determines whether or not the received charging voltage V is higher than or equal to the lower limit value Vmin and lower than or equal to the upper limit value Vmax. If the charging voltage V is higher than or equal to the lower limit value Vmin and lower than or equal to the upper limit value Vmax, the gas controller 32 ends the process of this flowchart and returns to the process shown in FIG. 3.

If the charging voltage V is higher than the upper limit value Vmax at S1905, the gas controller 32 opens the valve B-V at S1906. Supply of the buffer gas to the interior of the chamber 10 thus starts and the gas pressure P increases. Here, the buffer gas, which does not substantially include halogen gas, is supplied to the interior of the chamber 10. Accordingly, the partial pressure of halogen gas in the chamber 10 does not substantially change.

Next, at S1907, the gas controller 32 reads the gas pressure P in the chamber 10 from the pressure sensor 16.

Next, at S1908, the gas controller 32 determines whether or not the gas pressure P is higher than or equal to a predetermined gas pressure given by P0+ΔPt. The predetermined gas pressure given by P0+ΔPt is a value obtained by adding the amount of change ΔPt in the gas pressure to the initial value P0 stored at S1903. If the gas pressure P is lower than the predetermined gas pressure given by P0+ΔPt (S1908: NO), the gas controller 32 returns to S1907. If the gas pressure P is higher than or equal to the predetermined gas pressure given by P0+ΔPt (S1908: YES), the gas controller 32 proceeds to S1909.

At S1909, the gas controller 32 closes the valve B-V. The supply of the buffer gas to the interior of the chamber 10 thus ends. The gas controller 32 then ends the process of this flowchart and returns to the process shown in FIG. 3.

As described above, as the laser apparatus repeats the electric discharge and impurities are accumulated in the laser gas, the charging voltage V tends to be increased by the process of S15 to generate the laser beam having sufficient energy. Accordingly, if impurities are accumulated in the laser gas, the process from S1905 to S1909 increases the gas pressure P so as to suppress the increase of the charging voltage V.

If the charging voltage V is lower than the lower limit value Vmin at S1905, the gas controller 32 opens the valve EX-V2 at S1910. Exhaust of the laser gas in the chamber 10 thus starts and the gas pressure P decreases. Since this process is performed in the period of performing the laser oscillation, the gas pressure of the laser gas is not reduced to a value lower than or equal to the atmospheric pressure. Accordingly, the exhaust pump 46 is not driven and the valve EX-V1 is kept closed.

Next, at S1911, the gas controller 32 reads the gas pressure P in the chamber 10 from the pressure sensor 16.

Next, at S1912, the gas controller 32 determines whether or not the gas pressure P is lower than or equal to a predetermined gas pressure given by P0−ΔPt. The predetermined gas pressure given by P0−ΔPt is a value obtained by subtracting the amount of change ΔPt in the gas pressure from the initial value P0 stored at S1903. If the gas pressure P is higher than the predetermined gas pressure given by P0−ΔPt (S1912: NO), the gas controller 32 returns to S1911. If the gas pressure P is lower than or equal to the predetermined gas pressure given by P0−ΔPt (S1912: YES), the gas controller 32 proceeds to S1913.

At S1913, the gas controller 32 closes the valve EX-V2. The exhaust of the laser gas in the chamber 10 thus ends. The gas controller 32 then ends the process of this flowchart and returns to the process shown in FIG. 3.

3.2.3.3 Halogen Gas Injection Control

Figure 6:
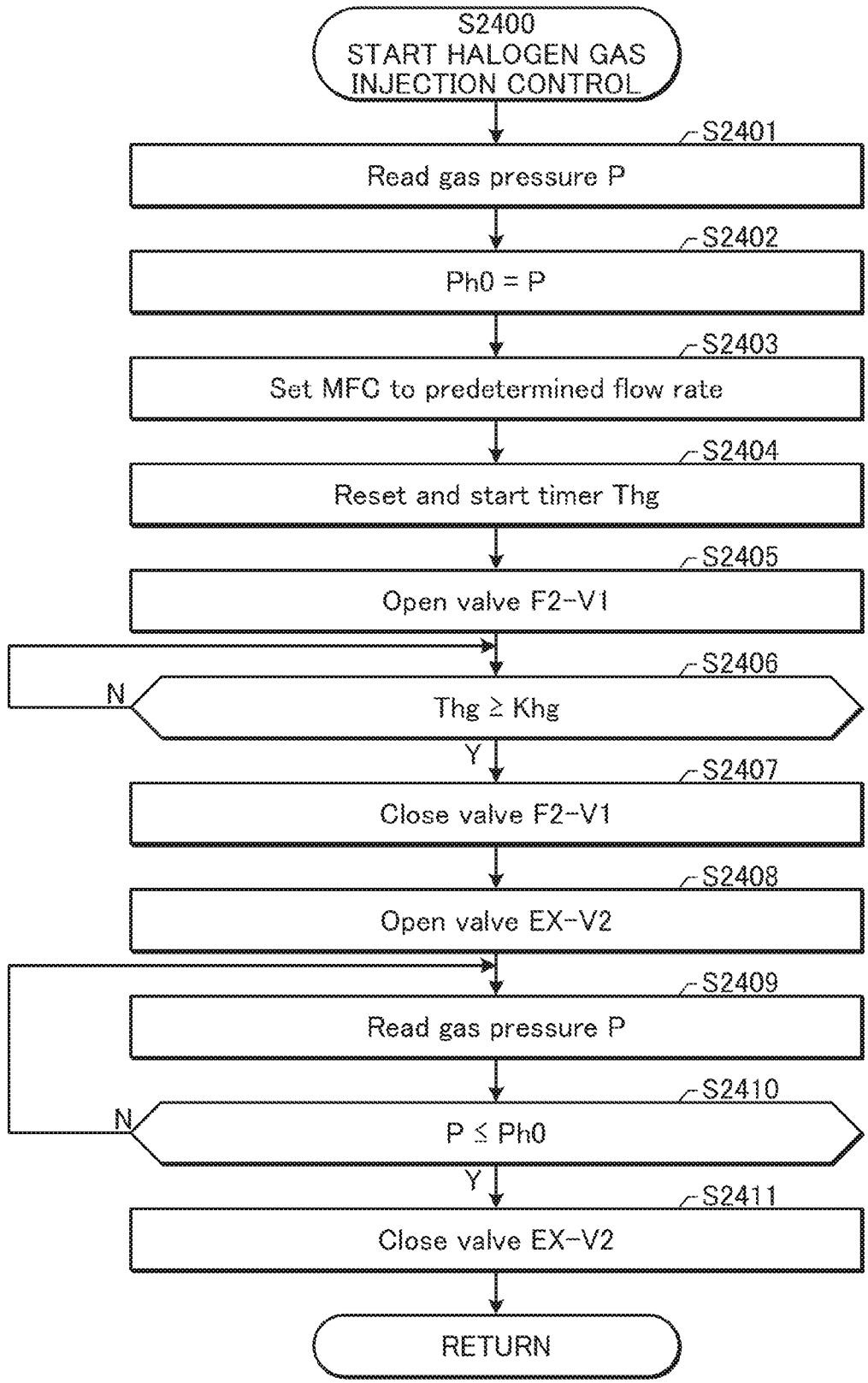
FIG. 6 is a flowchart showing details of a process of halogen gas injection control shown in FIG. 3.

FIG. 6 is a flowchart showing details of the process of the halogen gas injection control shown in FIG. 3. The process shown in FIG. 6 is performed as a subroutine of S2400 shown in FIG. 3 by the gas controller 32. The process of the total gas replacement described with reference to FIG. 4 is performed in the period of suspending the laser oscillation. In contrast, the halogen gas injection control described below is performed in the period of performing the laser oscillation.

First, at S2401, the gas controller 32 reads the gas pressure P in the chamber 10 from the pressure sensor 16.

Next, at S2402, the gas controller 32 stores the present gas pressure P as an initial value Ph0 of the gas pressure to the storage device.

Next, at S2403, the gas controller 32 sets the flow rate of the mass-flow controller MFC to a predetermined flow rate.

Next, at S2404, the gas controller 32 resets and starts a timer Thg.

Next, at S2405, the gas controller 32 opens the valve F2-V1. Injection of the halogen-containing gas into the chamber 10 thus starts at the predetermined flow rate set for the mass-flow controller MFC. By using the flow rate of the mass-flow controller MFC and the time measured by the timer Thg, an injection amount ΔPphg of the halogen-containing gas injected into the chamber 10 is precisely controlled. Here, the valve F2-V2 is kept closed.

Next, at S2406, the gas controller 32 determines whether or not the time measured by the timer Thg has reached a predetermined value Khg. If the time measured by the timer Thg has not reached the predetermined value Khg (S2406: NO), the gas controller 32 waits until the time reaches the predetermined value Khg. If the time measured by the timer Thg has reached the predetermined value Khg (S2406: YES), the gas controller 32 proceeds to S2407.

At S2407, the gas controller 32 closes the valve F2-V1. The injection of the halogen-containing gas into the chamber 10 thus stops.

Next, at S2408, the gas controller 32 opens the valve EX-V2. Exhaust of the laser gas in the chamber 10 thus starts. Here, the exhaust pump 46 is not driven and the valve EX-V1 is kept closed.

Next, at S2409, the gas controller 32 reads the gas pressure P in the chamber 10 from the pressure sensor 16.

Next, at S2410, the gas controller 32 determines whether or not the gas pressure P is lower than or equal to the initial value Ph0 stored at S2402. If the gas pressure P is higher than the initial value Ph0 (S2410: NO), the gas controller 32 returns to S2409. If the gas pressure P is lower than or equal to the initial value Ph0 (S2410: YES), the gas controller 32 proceeds to S2411.

At S2411, the gas controller 32 closes the valve EX-V2. The exhaust of the laser gas in the chamber 10 thus ends.

In the process from S2401 to S2407, the partial pressure of halogen gas in the chamber 10 increases. By the process from S2408 to S2411, the gas pressure P in the chamber 10 is returned to the initial value Ph0. Thus, although the partial pressure of halogen gas in the chamber 10 after the halogen gas injection control is higher than that before the halogen gas injection control, the gas pressures P in the chamber 10 before and after the halogen gas injection control are not substantially different from each other.

The gas controller 32 then ends the process of this flowchart and returns to the process shown in FIG. 3.

3.2.3.4 Partial Gas Replacement Control

Figure 7:
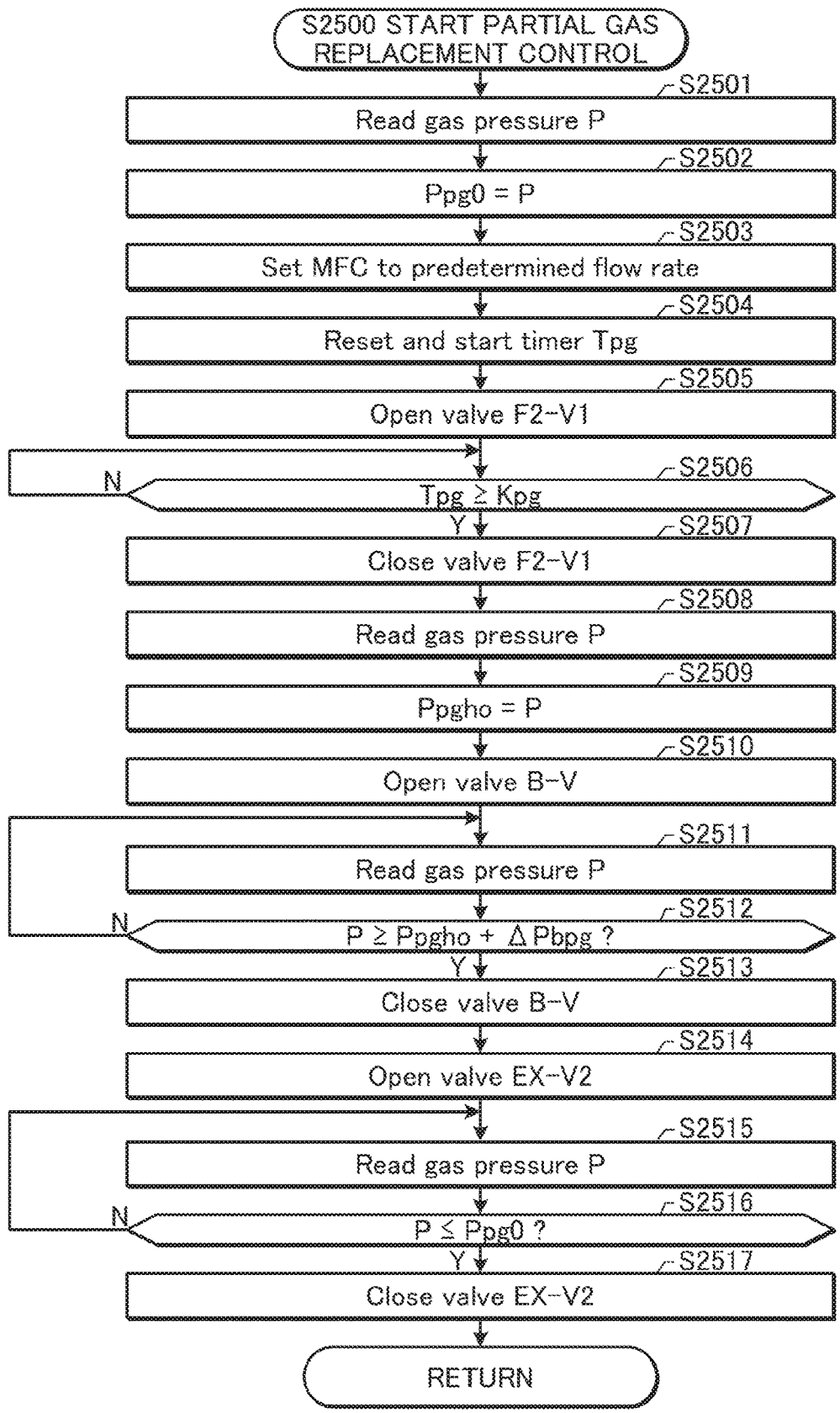
FIG. 7 is a flowchart showing details of a process of partial gas replacement control shown in FIG. 3.

FIG. 7 is a flowchart showing details of the process of the partial gas replacement control shown in FIG. 3. The process shown in FIG. 7 is performed as a subroutine of S2500 shown in FIG. 3 by the gas controller 32. The process of the total gas replacement described with reference to FIG. 4 is performed in the period of suspending the laser oscillation. In contrast, the partial gas replacement control described below is performed in the period of performing the laser oscillation.

First, the process from S2501 to S2507 is substantially the same as the process from S2401 to S2407 described with reference to FIG. 6, except for parameters to be used. The initial value Ph0 of the gas pressure, the timer Thg, and the predetermined value Khg are substituted by an initial value Ppg0 of the gas pressure, a timer Tpg, and a predetermined value Kpg, respectively. By the process from S2501 to S2507, the halogen-containing gas is injected into the chamber 10.

Next, by the process from S2508 to S2513, the buffer gas is injected into the chamber 10.

At S2508, the gas controller 32 reads the gas pressure P in the chamber 10 from the pressure sensor 16.

Next, at S2509, the gas controller 32 stores the present gas pressure P as an initial value Ppgh0 of the gas pressure to the storage device.

Next, at S2510, the gas controller 32 opens the valve B-V. Supply of the buffer gas to the interior of the chamber 10 thus starts.

Next, at S2511, the gas controller 32 reads the gas pressure P in the chamber 10 from the pressure sensor 16.

Next, at S2512, the gas controller 32 determines whether or not the gas pressure P is higher than or equal to a predetermined gas pressure given by Ppgh0+ΔPbpg. The predetermined gas pressure given by Ppgh0+ΔPbpg is a value obtained by adding a buffer gas injection amount ΔPbpg converted to a pressure to the initial value Ppgh0 stored at S2509. If the gas pressure P is lower than the predetermined gas pressure given by Ppgh0+ΔPbpg (S2512: NO), the gas controller 32 returns to S2511. If the gas pressure P is higher than or equal to the predetermined gas pressure given by Ppgh0+ΔPbpg (S2512: YES), the gas controller 32 proceeds to S2513.

At S2513, the gas controller 32 closes the valve B-V. The supply of the buffer gas into the chamber 10 thus ends.

Next, the process from S2514 to S2517 is substantially the same as the process from S2408 to S2411 described with reference to FIG. 6. However, by the process from S2514 to S2517, the gas pressure P is returned to the initial value Ppg0 stored at S2502. Thus, the gas pressures P in the chamber 10 before and after the partial gas replacement control are not substantially different from each other.

The ratio of the halogen-containing gas injection amount in the process from S2501 to S2507 to the buffer gas injection amount in the process from S2508 to S2513 is set to a value such that the halogen gas concentration in the chamber 10 does not substantially change. Accordingly, the partial pressures of halogen gas in the chamber 10 before and after the partial gas replacement control are not substantially different from each other.

The gas controller 32 then ends the process of this flowchart and returns to the process shown in FIG. 3.

3.2.3.5 Determination Whether or not Total Gas Replacement is to be Performed

FIG. 8 is a flowchart showing details of the process of determining whether or not the total gas replacement is to be performed shown in FIG. 3. The process shown in FIG. 8 is performed as a subroutine of S2600 shown in FIG. 3 by the gas controller 32.

First, at S2701, the gas controller 32 reads the value of the number of pulses Gshot of the pulse laser beam after the total gas replacement.

Next, at S2702, the gas controller 32 reads the value of the elapsed time Gtime after the total gas replacement.

Next, at S2705, the gas controller 32 determines whether or not the number of pulses Gshot of the pulse laser beam after the total gas replacement is less than the first number of pulses Gshot_limit. For example, the first number of pulses Gshot_limit is preferably 86 million or more and 500 million or less. If Gshot has not reached Gshot_limit (S2705: YES), the gas controller 32 proceeds to S2706. If Gshot has reached Gshot_limit (S2705: NO), the gas controller 32 proceeds to S2739.

At S2706, the gas controller 32 determines whether or not the elapsed time Gtime after the total gas replacement is less than a first elapsed time Gtime_limit. For example, the first elapsed time Gtime_limit is preferably 72 hours or more and 500 hours or less. If Gtime has not reached Gtime_limit (S2706: YES), the gas controller 32 ends the process of this flowchart and returns to the process shown in FIG. 3 without determining that the total gas replacement is to be performed. If Gtime has reached Gtime_limit (S2706: NO), the gas controller 32 proceeds to S2739.

At S2739, the gas controller 32 determines that the total gas replacement is to be performed. The gas controller 32 then ends the process of this flowchart and returns to the process shown in FIG. 3.

3.3 Problem

Figure 9:
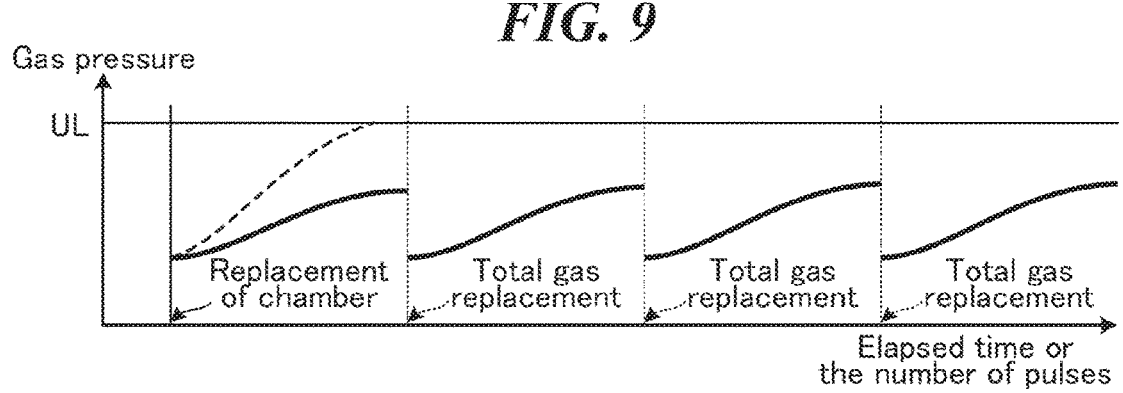
FIG. 9 is a graph showing changes in the gas pressure in a chamber of the comparative example.

FIG. 9 is a graph showing the change in the gas pressure in the chamber of the comparative example. The horizontal axis represents the number of pulses of the pulse laser beam or the elapsed time. The vertical axis represents the gas pressure in the chamber. In an excimer laser apparatus, an upper limit value UL of the gas pressure in the chamber is set. The upper limit value UL of the gas pressure is set to a value lower than a designed pressure limit to prevent a gas leak from the chamber and the pipes. The upper limit value UL of the gas pressure is stored, for example, in the storage memory 1005. If the gas pressure in the chamber exceeds the upper limit value UL, the gas controller 32 or the laser controller 30 generates an alarm and stops supplying the gas to the interior of the chamber.

The amount of impurities in the laser gas in the chamber is small immediately after the replacement of the chamber or the total gas replacement (see FIG. 4). In that case, even if the gas pressure in the chamber is not high, the laser beam having sufficient energy is generated. As the amount of impurities in the laser gas in the chamber increases, the gas pressure in the chamber increases through the gas pressure control (see FIG. 5) to generate the laser beam having sufficient energy.

Normally, as shown by the solid lines in FIG. 9, the number of pulses or the elapsed time reaches a corresponding preset value and the total gas replacement is performed before the gas pressure in the chamber reaches the upper limit value UL. However, in a case immediately after the replacement of the chamber, the surface portions of the components in the chamber may react with halogen gas in the laser gas and a larger amount of impurities may be generated than in a normal case. If a large amount of impurities is generated, as shown by the broken line in FIG. 9, the gas pressure in the chamber may reach the upper limit value UL before the number of pulses of the pulse laser beam or the elapsed time reaches the corresponding preset value. If the gas pressure in the chamber reaches the upper limit value UL, the pulse laser beam having the sufficient energy is not generated. This output error causes the laser apparatus to be stopped.

Such problem occurs immediately after the replacement of the chamber. When the components in the chamber are passivated, the generation of impurities is suppressed. Thus, possible measures may include, for example, performing frequent total gas replacements for passivation immediately after the replacement of the chamber. After the passivation of the components in the chamber, the frequency of the total gas replacement may be changed to a normal value. However, it takes time and effort to change the parameters in a manual operation. Further, the laser apparatus may have to be stopped for changing the parameters.

In an embodiment of the laser apparatus described below, a passivating mode performed immediately after the replacement of the chamber and a normal mode performed after the passivating mode are automatically switched.

4. Laser Apparatus in which Frequency of Total Gas Replacement is High Immediately after Replacement of Chamber FIG. 10 is a flowchart showing details of the process of determining whether or not the total gas replacement is to be performed in a laser apparatus according to a first embodiment of the present disclosure.

The laser apparatus according to the first embodiment is different from the comparative example described above in the process of determining whether or not the total gas replacement is to be performed. In the other aspects, the first embodiment may be substantially the same as the comparative example.

As described below, in the first embodiment, the frequency of the total gas replacement is higher in a case immediately after the replacement of the chamber than in a normal case.

Figure 10:
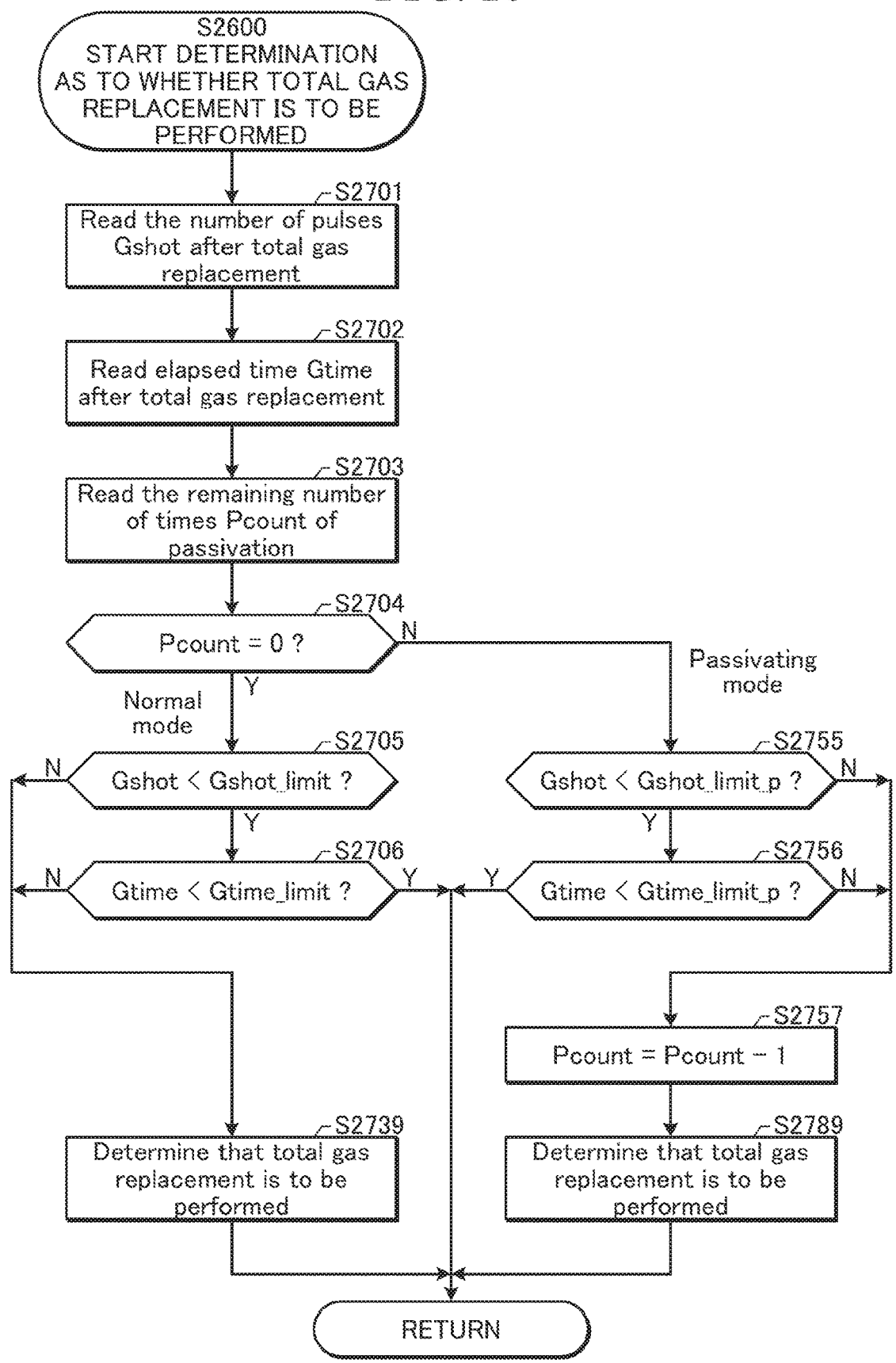
FIG. 10 is a flowchart showing details of a process of determining whether or not the total gas replacement is to be performed in a laser apparatus according to a first embodiment of the present disclosure.

First, the process of S2701 and S2702 in FIG. 10 is substantially the same as that described with reference to FIG. 8.

Next, at S2703, the gas controller 32 reads data of the remaining number of times Pcount of passivation from a storage device such as the storage memory 1005. The number of times of passivation is the number of times of the total gas replacement in the passivating mode. An initial value of the remaining number of times Pcount of passivation is the total number of times of the total gas replacement in the passivating mode and corresponds to a predetermined number of times in the present application. For example, the initial value of the remaining number of times Pcount of passivation is preferably 1 or more and 28 or less. The data of the remaining number of times Pcount of passivation may be inputted in advance by an operator with a user interface 1010 or the like described below and stored in the storage device, or inputted from another controller via a network or the like and stored in the storage device. Alternatively, after the replacement of the chamber, a serial number of the chamber or the number of pulses of the chamber after the replacement of the chamber may be inputted to the storage device. In that case, the serial number of the chamber or the number of pulses of the chamber may be inputted by an operator or inputted via a network or the like. The gas controller 32 may detect that the serial number of the chamber or the number of pulses of the chamber is updated and read from the storage device the remaining number of times Pcount of passivation inputted in advance.

Next, at S2704, the gas controller 32 determines whether or not the remaining number of times Pcount of passivation is 0. If the remaining number of times Pcount of passivation is 0 (S2704: YES), the gas controller 32 proceeds to S2705. The process from S2705 to S2739 is the process of the normal mode and substantially the same as the process described with reference to FIG. 8.

If the remaining number of times Pcount of passivation is not 0 (S2704: NO), the gas controller 32 proceeds to S2755. The process from S2755 to S2789 is the process of the passivating mode.

At S2755, the gas controller 32 determines whether or not the number of pulses Gshot of the pulse laser beam after the total gas replacement is less than the second number of pulses Gshot_limit_p. The second number of pulses Gshot_limit_p is the number of pulses smaller than the first number of pulses Gshot_limit described above. For example, Gshot_limit_p is preferably 14 million or more and 86 million or less. If Gshot has not reached Gshot_limit_p (S2755: YES), the gas controller 32 proceeds to S2756. If Gshot has reached Gshot_limit_p (S2755: NO), the gas controller 32 proceeds to S2757.

At S2756, the gas controller 32 determines whether or not the elapsed time Gtime after the total gas replacement is less than a second elapsed time Gtime_limit_p. The second elapsed time Gtime_limit_p is a length of time shorter than the first elapsed time Gtime_limit described above. For example, Gtime_limit_p is preferably 12 hours or more and 72 hours or less. If Gtime has not reached Gtime_limit_p (S2756: YES), the gas controller 32 ends the process of this flowchart and returns to the process shown in FIG. 3 without determining that the total gas replacement is to be performed. If Gtime has reached Gtime_limit_p (S2756: NO), the gas controller 32 proceeds to S2757.

At S2757, the gas controller 32 subtracts 1 from the present remaining number of times Pcount of passivation to update the value of Pcount.

Next, at S2789, the gas controller 32 determines that the total gas replacement is to be performed. The gas controller 32 then ends the process of this flowchart and returns to the process shown in FIG. 3.

According to this process, the total gas replacement is performed at a shorter interval of the number of pulses or the elapsed time in the passivating mode than in the normal mode.

Figure 11:
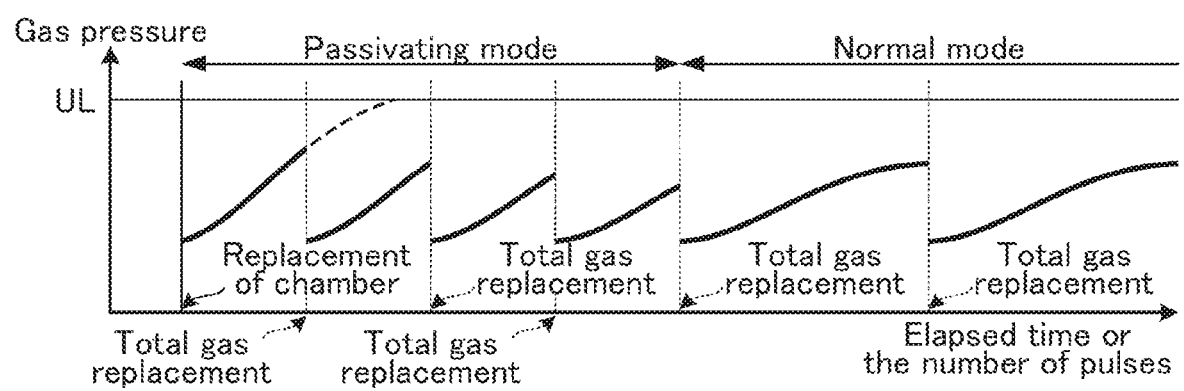
FIG. 11 is a graph showing changes in the gas pressure in a chamber of the first embodiment.

FIG. 11 is a graph showing changes in the gas pressure in the chamber of the first embodiment. The horizontal axis represents the number of pulses of the pulse laser beam or the elapsed time. The vertical axis represents the gas pressure in the chamber.

As shown by the broken line in FIG. 11, in a case immediately after the replacement of the chamber, the gas pressure in the chamber may increase in the small number of pulses or a short length of time since the amount of impurities generated in this case is larger than that generated in a normal case. However, in the process of the passivating mode, performing the total gas replacement at an early stage prevents the gas pressure in the chamber from reaching the upper limit value UL.

While the total gas replacement is performed for the predetermined number of times in the passivating mode, the surfaces of the components in the chamber are covered with coating and passivated. The generation of impurities is thus suppressed. Accordingly, the increase in the gas pressure gradually becomes gentle. The change to the normal mode when the value of Pcount reaches 0 does not cause the gas pressure in the chamber to reach the upper limit value UL.

5. Laser Apparatus in which Total Gas Replacement is Performed when Gas Pressure Reaches Predetermined Gas Pressure Immediately after Replacement of Chamber FIG. 12 is a flowchart showing details of the process of determining whether or not the total gas replacement is to be performed in the laser apparatus according to a second embodiment of the present disclosure.

The laser apparatus according to the second embodiment is different from the comparative example described above in the process of determining whether or not the total gas replacement is to be performed. In the other aspects, the second embodiment may be substantially the same as the comparative example.

As described below, in the second embodiment, the total gas replacement is performed when the gas pressure reaches a predetermined gas pressure immediately after the replacement of the chamber.

Figure 12:
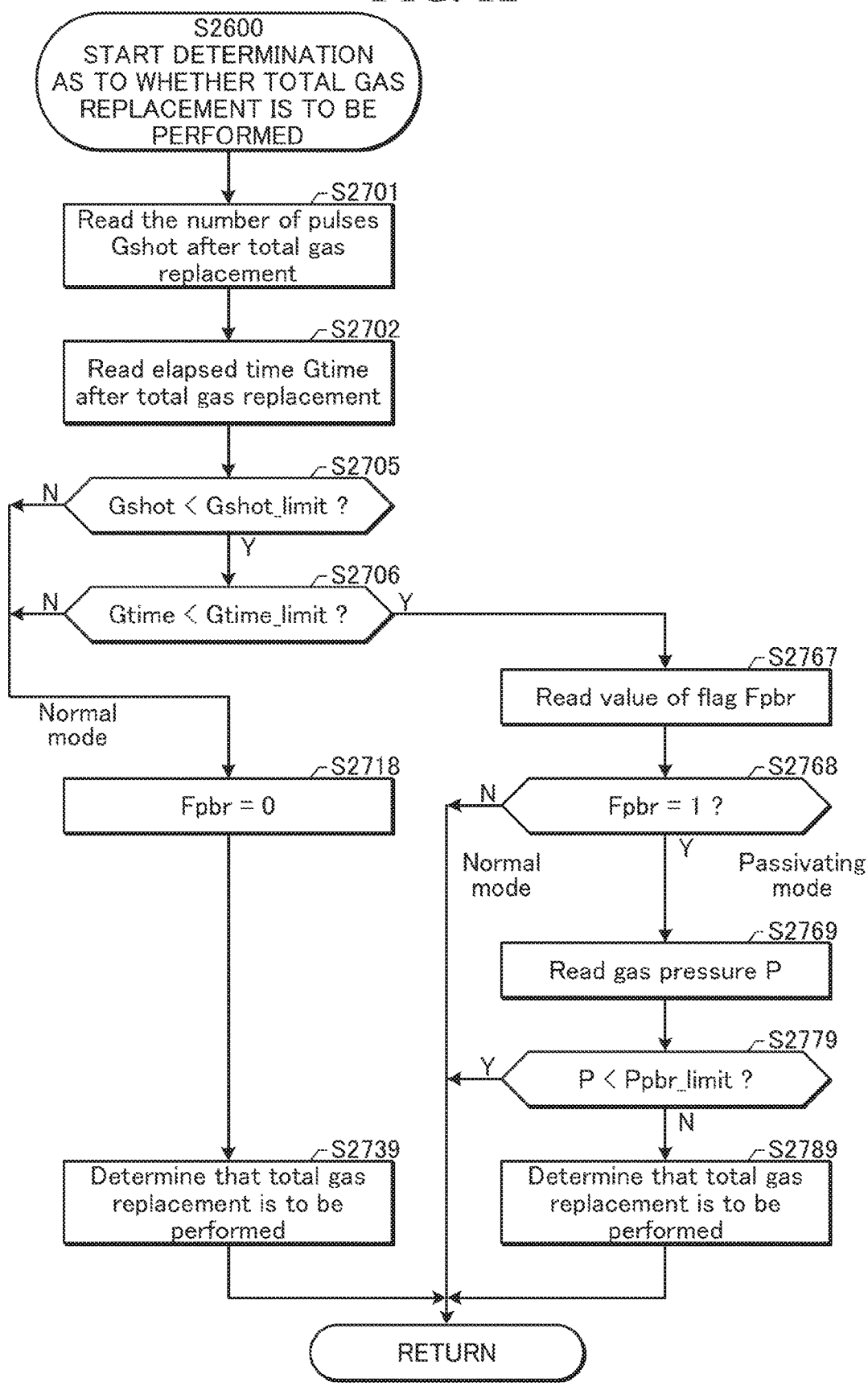
FIG. 12 is a flowchart showing details of a process of determining whether or not the total gas replacement is to be performed in a laser apparatus according to a second embodiment of the present disclosure.

First, the process of S2701 and S2702 in FIG. 12 is substantially the same as that described with reference to FIG. 8.

The process of S2705 and S2706 in FIG. 12 is also substantially the same as that described with reference to FIG. 8.

If Gshot is less than Gshot_limit at S2705 (S2705: YES) and Gtime is less than Gtime_limit at S2706 (S2706: YES), the gas controller 32 proceeds to S2767.

At S2767, the gas controller 32 reads the value of a flag Fbpr from the storage device. The value of the flag Fbpr is set to 1 as an initial value after the replacement of the chamber and before the value is changed to 0 at S2718. The value of the flag Fbpr may be inputted in advance by an operator and stored in the storage device or inputted from another controller via a network or the like and stored in the storage device. Alternatively, as described above for the remaining number of times Pcount of passivation in the first embodiment, the gas controller 32 may detect that the serial number of the chamber or the number of pulses of the chamber is updated and read from the storage device the flag Fbpr inputted in advance.

Next, at S2768, the gas controller 32 determines whether or not the value of the flag Fbpr is 1. If the value of the flag Fbpr is 1 (S2768: YES), the gas controller 32 proceeds to S2769. The process from S2769 to S2789 is the process of the passivating mode.

At S2769, the gas controller 32 reads the data on the gas pressure P outputted from the pressure sensor 16. Next, at S2779, the gas controller 32 determines whether or not the gas pressure P is less than a pressure Ppbr_limit at which the total gas replacement is demanded. The pressure Ppbr_limit is set to a value lower than the upper limit value UL of the gas pressure. For example, the pressure Ppbr_limit is set to a value that is 90% or higher and 99% or lower of the upper limit value UL of the gas pressure. The pressure Ppbr_limit corresponds to a first predetermined gas pressure in the present application. The upper limit value UL of the gas pressure corresponds to a second predetermined gas pressure in the present application.

If the gas pressure P has reached Ppbr_limit at S2779 (S2779: NO), the gas controller 32 proceeds to S2789. At S2789, the gas controller 32 determines that the total gas replacement is to be performed. The gas controller 32 then ends the process of this flowchart and returns to the process shown in FIG. 3.

If the gas pressure P has not reached Ppbr_limit at S2779 (S2779: YES), the gas controller 32 ends the process of this flowchart and returns to the process shown in FIG. 3 without determining that the total gas replacement is to be performed.

If Gshot has reached Gshot_limit at S2705 (S2705: NO) or Gtime has reached Gtime_limit at S2706 (S2706: NO), the gas controller 32 proceeds to S2718. In the case where the result of the determination of S2705 or S2706 is NO, Gshot has reached Gshot_limit or Gtime has reached Gtime_limit before the gas pressure P reaches Ppbr_limit at S2779. In that case, it is determined that the surfaces of the components in the chamber are covered with coating and passivated. Thus, at S2718, the gas controller 32 sets the value of the flag Fbpr to 0. The process of S2718 and S2739 is a part of the process of the normal mode. The process of S2739 is substantially the same as that described with reference to FIG. 8.

If the value of the flag Fbpr is once set to 0, then the determination at S2768 is NO and the process from S2769 to S2789 is not performed. The process after the determination at S2768 is made NO is another part of the process of the normal mode. If the determination at S2768 is NO, the gas controller 32 ends the process of this flowchart and returns to the process shown in FIG. 3 without determining that the total gas replacement is to be performed.

Figure 13:
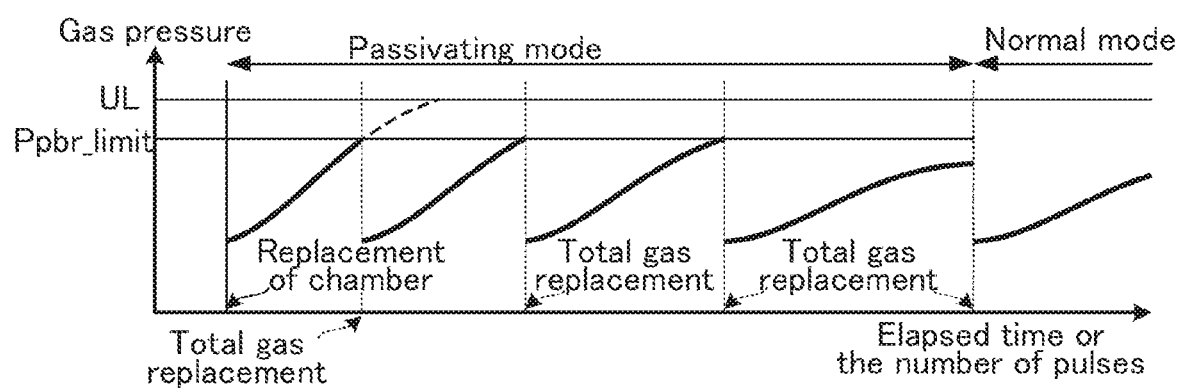
FIG. 13 is a graph showing changes in the gas pressure in a chamber of the second embodiment.

FIG. 13 is a graph showing the change in the gas pressure in the chamber of the second embodiment. The horizontal axis represents the number of pulses of the pulse laser beam or the elapsed time. The vertical axis represents the gas pressure in the chamber.

As shown by the broken line in FIG. 13, in a case immediately after the replacement of the chamber, the gas pressure in the chamber may increase in the small number of pulses or a short length of time since the amount of impurities generated in this case is larger than that generated in a normal case. However, in the process of the passivating mode, the total gas replacement is performed before the gas pressure in the chamber reaches the upper limit value UL.

While the total gas replacement is repeated in the passivating mode, the surfaces of the components in the chamber are covered with coating and passivated. The generation of impurities is thus suppressed. Accordingly, the increase in the gas pressure gradually becomes gentle. If Gshot reaches Gshot_limit or Gtime reaches Gtime_limit before the gas pressure P reaches Ppbr_limit, the gas controller 32 may end the passivating mode and remove the limit of Ppbr_limit.

6. Laser Apparatus in which Injection and Exhaust Amount in Partial Gas Replacement or Halogen Gas Injection is Large Immediately after Replacement of Chamber FIG. 14 is a flowchart showing a process of laser gas control performed by a gas controller 32 of a laser apparatus according to a third embodiment of the present disclosure.

The laser apparatus according to the third embodiment is different from the comparative example in the process of the gas controller 32. In the other aspects, the third embodiment may be substantially the same as the comparative example.

As described below, in the third embodiment, the injection and exhaust amount in the partial gas replacement or the halogen gas injection is larger in a case immediately after the replacement of the chamber than in a normal case.

Figure 14:
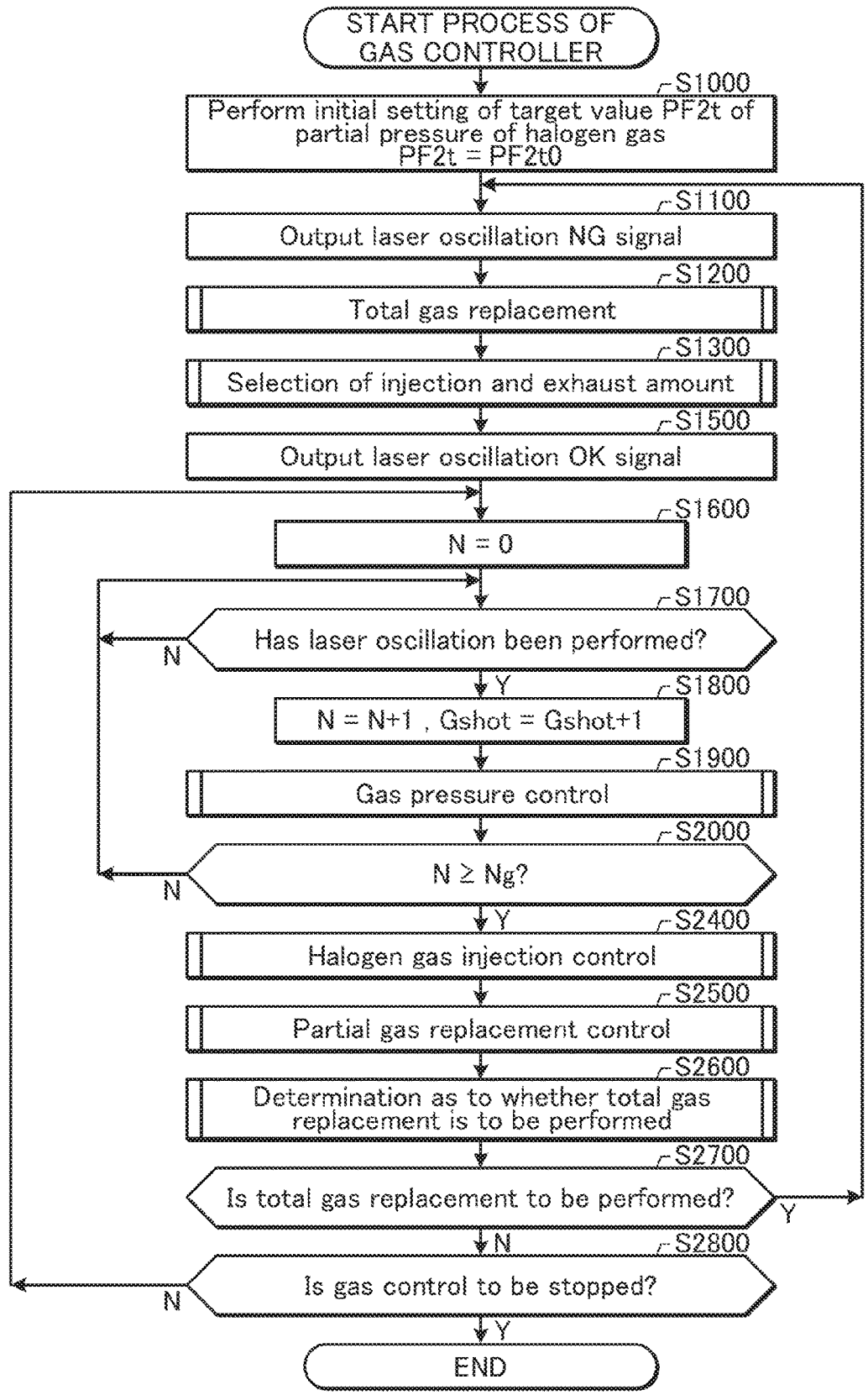
FIG. 14 is a flowchart showing a process of laser gas control performed by a gas controller 32 of a laser apparatus according to a third embodiment of the present disclosure.

First, the process from S1000 to S1200 in FIG. 14 is substantially the same as that described with reference to FIG. 3.

After the total gas replacement at S1200, the gas controller 32 selects the injection and exhaust amount at S1300. The injection and exhaust amount selected in the passivating mode is different from that in the normal mode. Details of the process of selecting the injection and exhaust amount are described below with reference to FIG. 15.

Next, the process from S1500 to S2800 is substantially the same as that described with reference to FIG. 3. The injection and exhaust amount selected at S1300 is used in performing the halogen gas injection control at S2400 and performing the partial gas replacement control at S2500.

Figure 15:
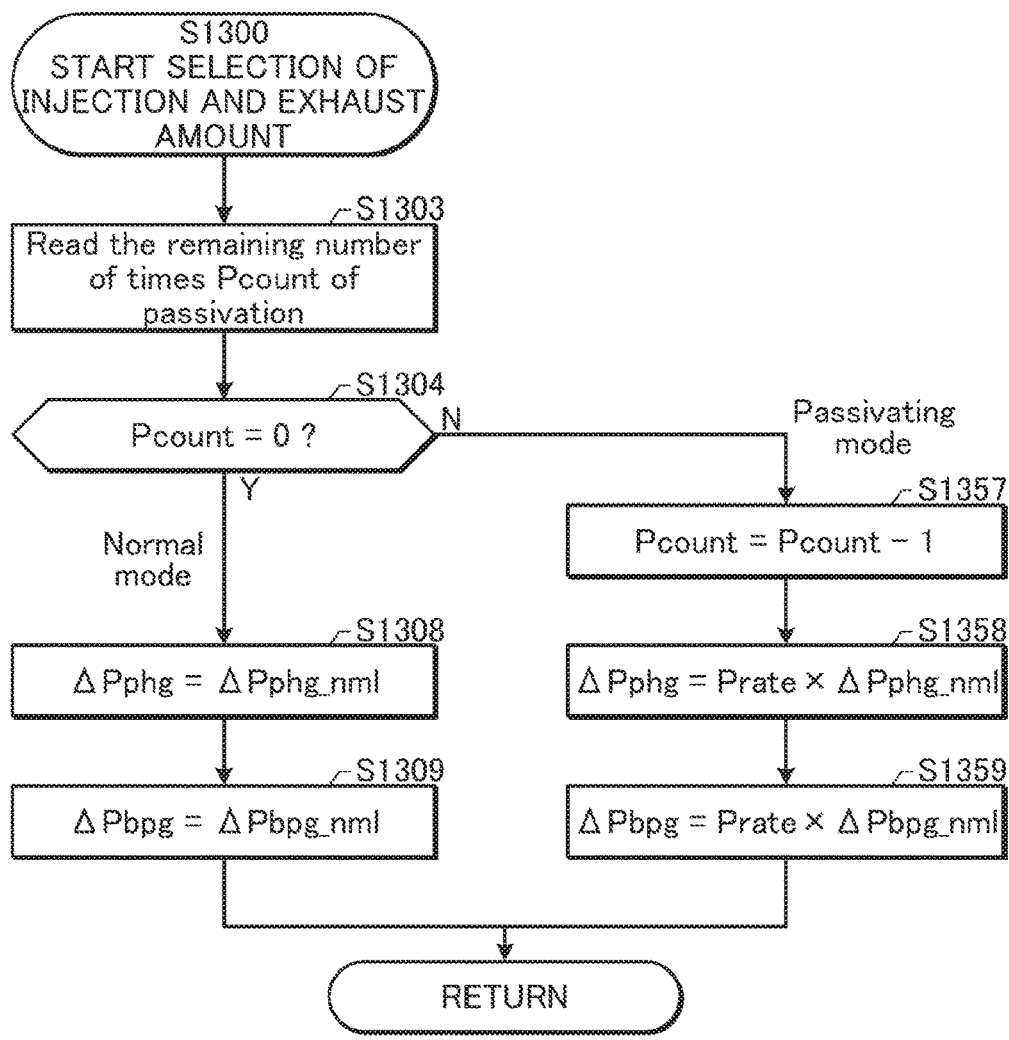
FIG. 15 is a flowchart showing details of a process of selecting an injection and exhaust amount shown in FIG. 14.

FIG. 15 is a flowchart showing details of the process of selecting the injection and exhaust amount shown in FIG. 14. The process shown in FIG. 15 is performed as a subroutine of S1300 shown in FIG. 14 by the gas controller 32.

First, at S1303, the gas controller 32 reads data of the remaining number of times Pcount of passivation. The number of times of passivation is the number of times of the total gas replacement in the passivating mode. An initial value of the remaining number of times Pcount of passivation is the total number of times of the total gas replacement in the passivating mode and corresponds to the predetermined number of times in the present application. For example, the initial value of the remaining number of times Pcount of passivation is preferably 1 or more and 28 or less.

Next, at S1304, the gas controller 32 determines whether or not the remaining number of times Pcount of passivation is 0. If the remaining number of times Pcount of passivation is 0 (S1304: YES), the gas controller 32 proceeds to S1308. The process of S1308 and S1309 is the process of the normal mode.

At S1308, the gas controller 32 sets the halogen-containing gas injection amount ΔPphg in the halogen gas injection control (S2400) to a normal value ΔPphg_nml of the injection amount. Based on the halogen-containing gas injection amount ΔPphg, the predetermined value Khg in S2406 is set.

Next, at S1309, the gas controller 32 sets the buffer gas injection amount ΔPbpg in the partial gas replacement control (S2500) to a normal value ΔPbpg_nml of the injection amount. Based on the buffer gas injection amount ΔPbpg, the predetermined value Kpg in S2506 is set. Based on the buffer gas injection amount ΔPbpg, the determination at S2512 is performed.

After S1309, the gas controller 32 ends the process of this flowchart and returns to the process shown in FIG. 14.

If the remaining number of times Pcount of passivation is not 0 at S1304 (S1304: NO), the gas controller 32 proceeds to S1357. The process from S1357 to S1359 is the process of the passivating mode.

At S1357, the gas controller 32 subtracts 1 from the present remaining number of times Pcount of passivation to update the value of Pcount. As described above, the injection and exhaust amount is selected after the total gas replacement of S1200. Accordingly, every time the total gas replacement is performed in the passivating mode, the value of Pcount is counted down at S1357.

Next, at S1358, the gas controller 32 sets the halogen-containing gas injection amount ΔPphg in the halogen gas injection control (S2400) to a value obtained by multiplying the normal value ΔPphg_nml of the injection amount by a predetermined rate Prate. The value of the predetermined rate Prate is larger than 1. The value of the predetermined rate Prate is, for example, 200%.

Next, at S1359, the gas controller 32 sets the buffer gas injection amount ΔPbpg in the partial gas replacement control (S2500) to a value obtained by multiplying the normal value ΔPbpg_nml of the injection amount by the predetermined rate Prate.

After S1359, the gas controller 32 ends the process of this flowchart and returns to the process shown in FIG. 14.

According to this process of selecting the injection and exhaust amount, the halogen gas injection control and the partial gas replacement control are performed in the passivating mode to inject the gas having an injection amount more than normal into the chamber and exhaust the gas having an exhaust amount equivalent to the injection amount from the chamber. Thus, a large amount of impurities in the chamber is exhausted in the halogen gas injection control and the partial gas replacement control and accumulation of the impurities in the chamber is suppressed.

Figure 16:
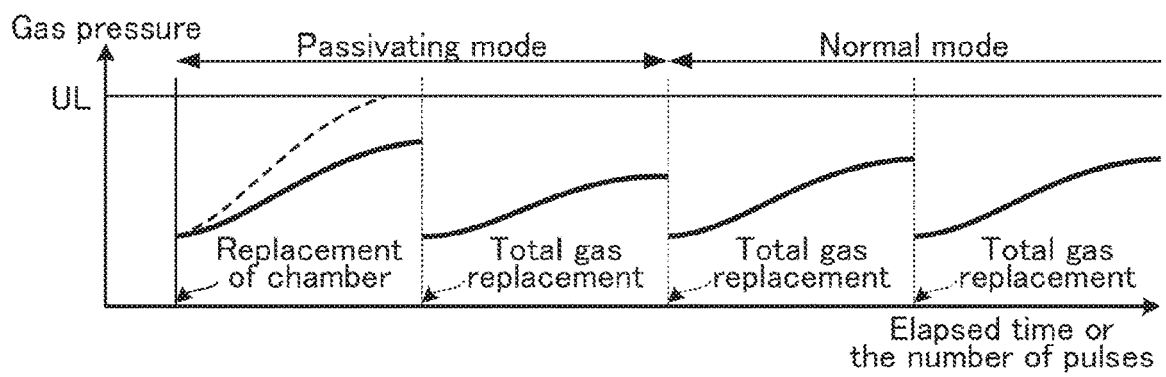
FIG. 16 is a graph showing changes in the gas pressure in a chamber of the third embodiment.

FIG. 16 is a graph showing the change in the gas pressure in the chamber of the third embodiment. The horizontal axis represents the number of pulses of the pulse laser beam or the elapsed time. The vertical axis represents the gas pressure in the chamber.

As shown by the broken line in FIG. 16, in a case immediately after the replacement of the chamber, the gas pressure in the chamber may increase in the small number of pulses or a short length of time since the amount of impurities generated in this case is larger than that generated in a normal case. However, in the process of the passivating mode, the injection amount and the exhaust amount in the halogen gas injection control and/or the partial gas replacement control are increased. Thus, accumulation of the impurities in the chamber is suppressed and increase in the gas pressure in the chamber is suppressed.

While the total gas replacement is performed for the predetermined number of times in the passivating mode, the surfaces of the components in the chamber are covered with coating and passivated. The generation of impurities is thus suppressed. Accordingly, the increase in the gas pressure becomes gentle. The change to the normal mode when the value of Pcount reaches 0 does not cause the gas pressure in the chamber to reach the upper limit value UL.

In the third embodiment, the halogen-containing gas injection amount ΔPphg and the buffer gas injection amount ΔPbpg in the passivating mode are different from those in the normal mode. However, the present disclosure is not limited to this. The amount of change ΔPt (see S1908 and S1912 in FIG. 5) in the gas pressure in the gas pressure control in the passivating mode may be made different from that in the normal mode to suppress accumulation of impurities.

7. MOPO System

Figure 17:
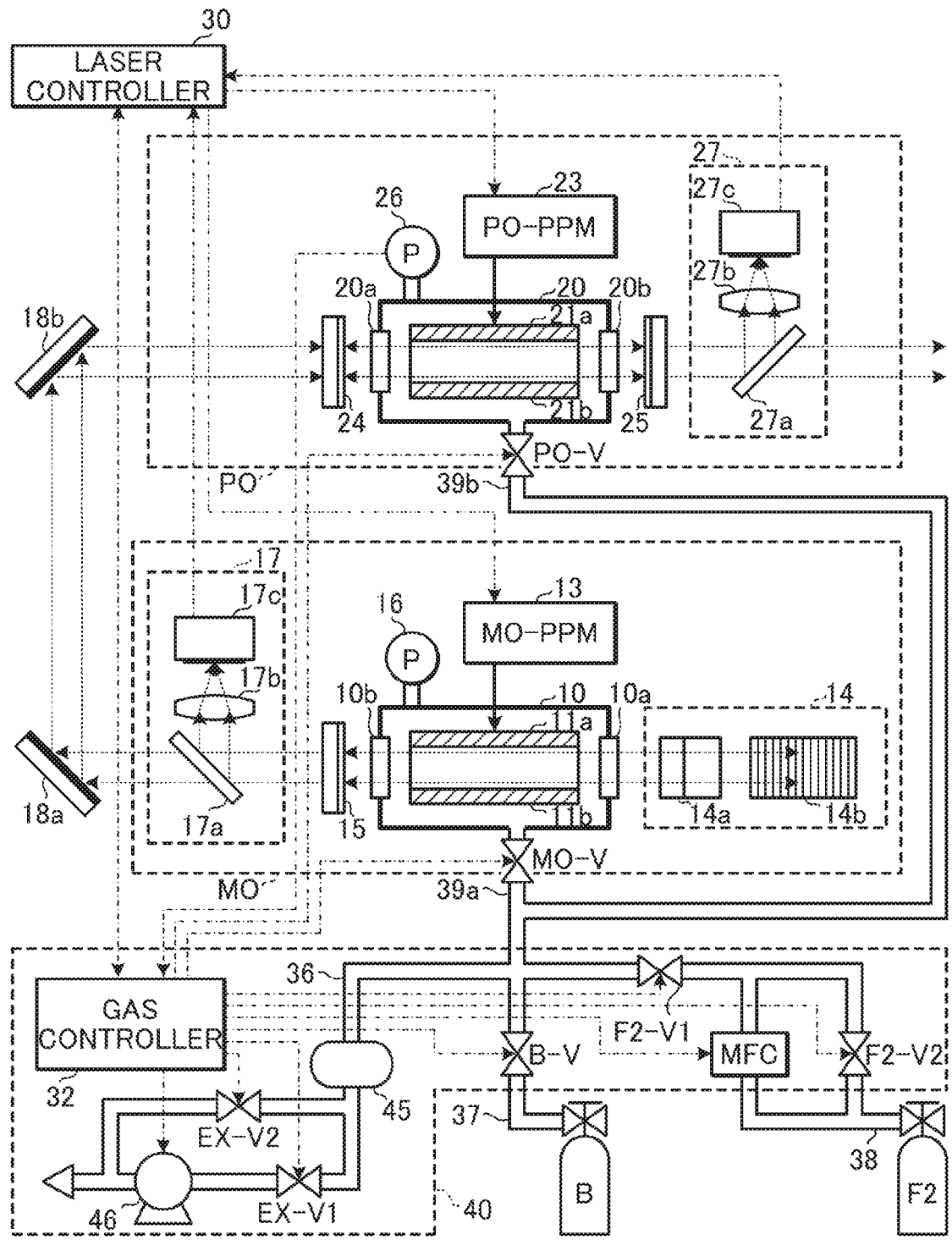
FIG. 17 schematically shows a configuration of a laser apparatus according to a fourth embodiment of the present disclosure.

FIG. 17 schematically shows a configuration of a laser apparatus according to a fourth embodiment of the present disclosure. The laser apparatus according to the fourth embodiment includes a master oscillator MO and a power oscillator PO. The configuration of the master oscillator MO is substantially the same as the configuration of the laser oscillation system in the comparative example.

The power oscillator PO includes a chamber 20, a pulse power module 23, an output coupling mirror 25, a pressure sensor 26, and an energy monitor 27. The chamber 20 is accompanied by two windows 20a and 20b. The chamber 20 accommodates a pair of discharge electrodes 21a and 21b. The energy monitor 27 includes a beam splitter 27a, a focusing lens 27b, and an optical sensor 27c. Configurations of these elements are substantially the same as those of corresponding elements of the master oscillator MO.

The power oscillator PO includes a partially reflective mirror 24 instead of the line narrow module 14. In an optical path of the laser beam outputted from the master oscillator MO, high-reflective mirrors 18a and 18b are provided. In an optical path of the laser beam reflected by the high-reflective mirrors 18a and 18b in this order, the partially reflective mirror 24 is provided. At least a part of the laser beam outputted from the master oscillator MO is transmitted by the partially reflective mirror 24 and enters to the chamber 20. The partially reflective mirror 24 and the output coupling mirror 25 constitute an optical resonator.

A pipe in the gas supply and exhaust device 40 is divided into two branches to be connected to the chamber 10 of the master oscillator MO and the chamber 20 of the power oscillator PO. Among the two branches, a first branched pipe 39a connected to the chamber 10 of the master oscillator MO is accompanied by a valve MO-V and a second branched pipe 39b connected to the chamber 20 of the power oscillator PO is accompanied by a valve PO-V. These valves MO-V and PO-V are capable of being opened and closed separately from each other.

The gas supply and exhaust device 40 is thus capable of performing the gas control of either one or both of the chamber 10 of the master oscillator MO and the chamber 20 of the power oscillator PO. For example, the gas control including the passivating mode may be performed for the chamber 10 of the master oscillator MO immediately after the replacement of the chamber 10. Further, the gas control including the passivating mode may be performed for the chamber 20 of the power oscillator PO immediately after the replacement of the chamber 20.

8. Configuration of Controller

Figure 18:
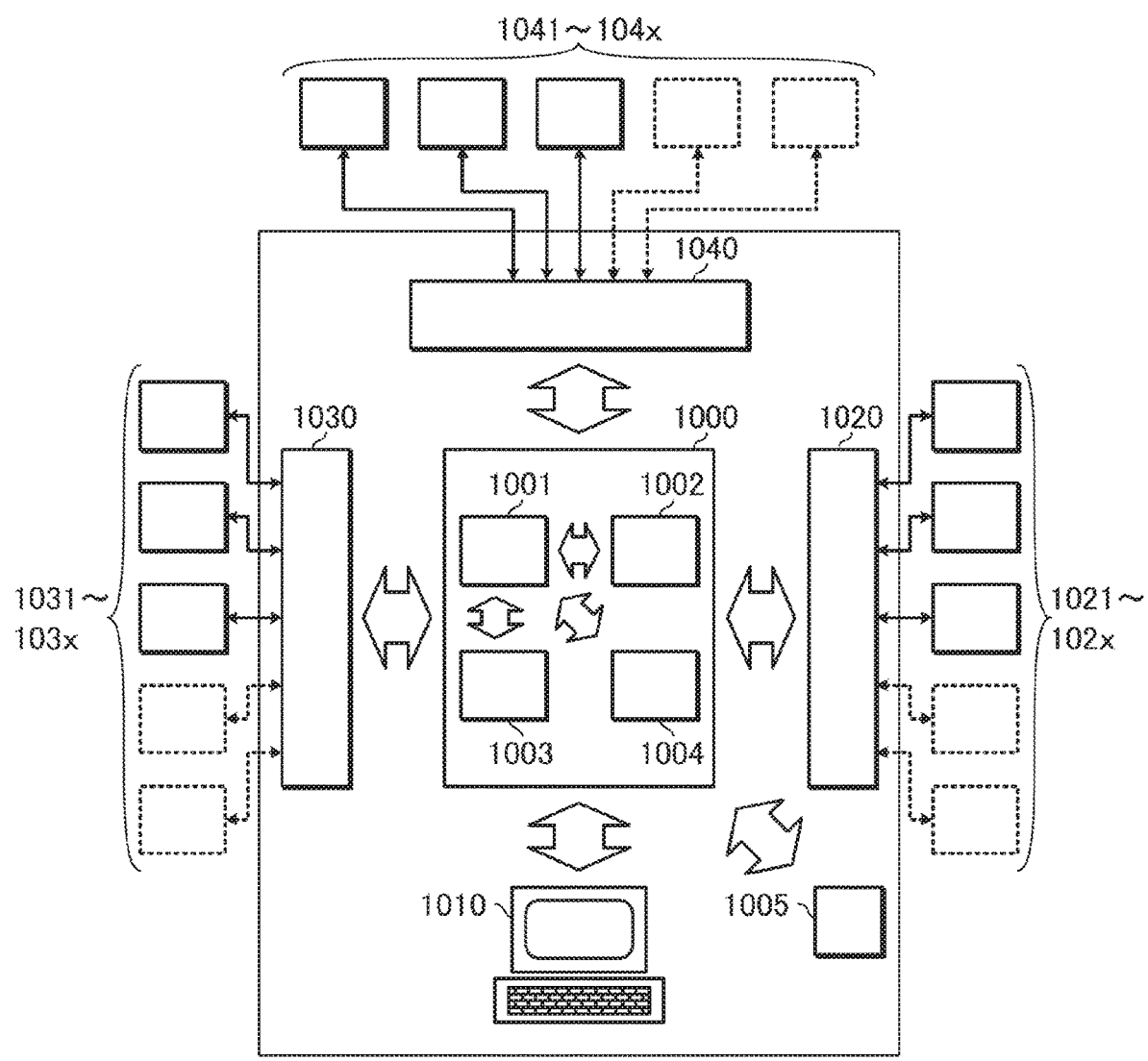
FIG. 18 is a block diagram showing a general configuration of a controller.

FIG. 18 is a block diagram showing a general configuration of the controller.

Controllers of the above-described embodiments, such as the gas controller 32, may be configured by general-purpose control devices, such as computers or programmable controllers. For example, the controllers may be configured as follows.

(Configuration)

The controllers may each include a processor 1000, and a storage memory 1005, a user interface 1010, a parallel input/output (I/O) controller 1020, a serial I/O controller 1030, and an analog-to-digital (A/D) and digital-to-analog (D/A) converter 1040 which are connected to the processor 1000. The processor 1000 may include a central processing unit (CPU) 1001, and a memory 1002, a timer 1003, and a graphics processing unit (GPU) 1004 which are connected to the CPU 1001.

(Operation)

The processor 1000 may read a program stored in the storage memory 1005. The processor 1000 may also execute the read program, read data from the storage memory 1005 or store data in the storage memory 1005 in accordance with the program.

The parallel I/O controller 1020 may be connected to devices 1021 to 102x with which it may communicate through parallel I/O ports. The parallel I/O controller 1020 may control digital-signal communication through the parallel I/O ports while the processor 1000 executes the program.

The serial I/O controller 1030 may be connected to devices 1031 to 103x with which it may communicate through serial I/O ports. The serial I/O controller 1030 may control digital-signal communication through the serial I/O ports while the processor 1000 executes the program.

The A/D and D/A converter 1040 may be connected to devices 1041 to 104x with which it may communicate through analog ports. The A/D and D/A converter 1040 may control analog-signal communication through the analog ports while the processor 1000 executes the program.

The user interface 1010 may be configured to display the progress of the program being executed by the processor 1000 in accordance with instructions from an operator. The user interface 1010 may cause the processor 1000 to stop the execution of the program or perform an interrupt in accordance with instructions from the operator. Further, the user interface 1010 may allow the operator to input data such as the remaining number of times Pcount of passivation, the serial number of the chamber, and the number of pulses of the chamber after the replacement of the chamber.

The CPU 1001 of the processor 1000 may perform arithmetic processing of the program. The memory 1002 may temporarily store the program being executed by the CPU 1001 or temporarily store data in the arithmetic processing. The timer 1003 may measure time or elapsed time period and output it to the CPU 1001 in accordance with the program being executed. When image data is inputted to the processor 1000, the GPU 1004 may process the image data in accordance with the program being executed and output the results to the CPU 1001.

The devices 1021 to 102x, which are connected through the parallel I/O ports to the parallel I/O controller 1020, may be the exposure apparatus 100, which sends the oscillation trigger signal or the setting signal of the target value of pulse energy, or other controllers or the like. Further, the devices 1021 to 102x may be the charger 12, which receives the setting signal of the charging voltage, or the valve B-V, F2-V1, or EX-V1, or the like.

The devices 1031 to 103x, which are connected through the serial I/O ports to the serial I/O controller 1030, may be the motor 22, the exhaust pump 46, or the like.

The devices 1041 to 104x, which are connected through the analog ports to the A/D and D/A converter 1040, may be various sensors such as the pressure sensor 16 or the optical sensor 17c.

The controllers thus configured may be capable of realizing the operations described in the embodiments.

The above descriptions are intended to be only illustrative rather than being limiting. Accordingly, it will be clear to those skilled in the art that various changes may be made to the embodiments of the present disclosure without departing from the scope of the appended claims.

The terms used in the present specification and the appended claims are to be interpreted as not being limiting. For example, the term "include" or "included" should be interpreted as not being limited to items described as being included. Further, the term "have" should be interpreted as not being limited to items described as being had. Furthermore, the modifier "a" or "an" as used in the present specification and the appended claims should be interpreted as meaning "at least one" or "one or more".

The invention claimed is:

1. A laser apparatus comprising:
a chamber accommodating a pair of discharge electrodes;
a gas supply and exhaust device configured to supply laser gas to an interior of the chamber and exhaust laser gas from the interior of the chamber; and
a controller configured to perform
first control to control the gas supply and exhaust device so as to suspend laser oscillation and replace laser gas in the chamber, the first control including exhausting laser gas to reduce the pressure in the chamber to a value lower than or equal to an atmospheric pressure and then injecting laser gas into the chamber, the first control being performed at every first number of pulses or every first elapsed time, and
second control to control the gas supply and exhaust device so as to suspend laser oscillation and replace laser gas in the chamber, the second control including exhausting laser gas to reduce the pressure in the chamber to a value lower than or equal to the atmospheric pressure and then injecting laser gas into the chamber, the second control being performed after replacement of the chamber and before the first control at every second number of pulses less than the first number of pulses or every second elapsed time less than the first elapsed time.

2. The laser apparatus according to claim 1, wherein the controller performs the second control for a predetermined number of times after the replacement of the chamber, and then performs the first control.

3. The laser apparatus according to claim 2, wherein the predetermined number of times is 1 or more and 28 or less.

4. The laser apparatus according to claim 1, wherein the first number of pulses is 86 million or more and 500 million or less, and the second number of pulses is 14 million or more and 86 million or less.

5. The laser apparatus according to claim 1, wherein the first elapsed time is 72 hours or more and 500 hours or less, and the second elapsed time is 12 hours or more and 72 hours or less.

6. A laser apparatus comprising:
a chamber accommodating a pair of discharge electrodes;
a gas supply and exhaust device configured to supply laser gas to an interior of the chamber and exhaust laser gas from the interior of the chamber;
a pressure sensor configured to measure a gas pressure in the chamber; and
a controller configured to perform
first control to control the gas supply and exhaust device so as to suspend laser oscillation and replace laser gas in the chamber, the first control including exhausting laser gas to reduce the pressure in the chamber to a value lower than or equal to an atmospheric pressure and then injecting laser gas into the chamber, the first control being performed at every first number of pulses or every first elapsed time, and second control to control the gas supply and exhaust device so as to suspend laser oscillation and replace laser gas in the chamber, the second control including exhausting laser gas to reduce the pressure in the chamber to a value lower than or equal to the atmospheric pressure and then injecting laser gas into the chamber, the second control being performed when the gas pressure in the chamber reaches a first predetermined gas pressure after replacement of the chamber and before the first control.

7. The laser apparatus according to claim 6, wherein the controller performs the first control when a number of pulses reaches the first number of pulses before the gas pressure in the chamber reaches the first predetermined gas pressure.

8. The laser apparatus according to claim 7, wherein the first number of pulses is 86 million or more and 500 million or less.

9. The laser apparatus according to claim 6, wherein the controller performs the first control when the first elapsed time is elapsed before the gas pressure in the chamber reaches the first predetermined gas pressure.

10. The laser apparatus according to claim 9, wherein the first elapsed time is 72 hours or more and 500 hours or less.

11. A laser apparatus comprising:
a chamber accommodating a pair of discharge electrodes;
a gas supply and exhaust device configured to supply laser gas to an interior of the chamber and exhaust laser gas from the interior of the chamber;
a pressure sensor configured to measure a gas pressure in the chamber; and
a controller configured to perform
first control to control the gas supply and exhaust device so as to suspend laser oscillation and replace laser gas in the chamber at every first number of pulses or first elapsed time,
second control to control the gas supply and exhaust device so as to suspend laser oscillation and replace laser gas in the chamber when the gas pressure in the chamber reaches a first predetermined gas pressure before the first control, and
third control to stop a process of supplying laser gas to the interior of the chamber performed by the gas supply and exhaust device when the gas pressure in the chamber reaches a second predetermined gas pressure higher than the first predetermined gas pressure, wherein
the first predetermined gas pressure is 90% or higher and 99% or lower of the second predetermined gas pressure.

* * * * *